US 9,900,850 B2

(12) United States Patent
Zhuang et al.

(10) Patent No.: US 9,900,850 B2
(45) Date of Patent: Feb. 20, 2018

(54) METHOD AND APPARATUS FOR JOINT CONFIGURATION OF POWER AND CHANNEL OF WLAN

(71) Applicant: Huawei Technologies Co., Ltd., Shenzhen (CN)

(72) Inventors: Hongcheng Zhuang, Shenzhen (CN); Zezhou Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

(21) Appl. No.: 15/099,224

(22) Filed: Apr. 14, 2016

(65) Prior Publication Data

US 2016/0234792 A1  Aug. 11, 2016

Related U.S. Application Data

(63) Continuation of application No. PCT/CN2013/085491, filed on Oct. 18, 2013.

(51) Int. Cl.
*H04W 72/00* (2009.01)
*H04W 52/34* (2009.01)
(Continued)

(52) U.S. Cl.
CPC ......... *H04W 52/346* (2013.01); *H04W 24/02* (2013.01); *H04W 52/0206* (2013.01); *H04W 52/143* (2013.01); *H04W 52/241* (2013.01); *H04W 52/243* (2013.01); *H04W 52/367* (2013.01); *H04W 52/343* (2013.01);
(Continued)

(58) Field of Classification Search
CPC .................................................. H04W 52/346
See application file for complete search history.

(56) References Cited

U.S. PATENT DOCUMENTS

| 7,440,416 | B2 * | 10/2008 | Mahany | ............... H04L 1/0002 370/235 |
| 2005/0003827 | A1 * | 1/2005 | Whelan | ............... H04W 16/10 455/454 |
| 2014/0024388 | A1 * | 1/2014 | Earnshaw | ............ H04W 72/02 455/452.2 |

FOREIGN PATENT DOCUMENTS

| CN | 1589055 A | 3/2005 |
| CN | 2847709 Y | 12/2006 |
| CN | 103338504 A | 10/2013 |

* cited by examiner

*Primary Examiner* — Gerald Smarth
(74) *Attorney, Agent, or Firm* — Leydig, Voit & Mayer, Ltd.

(57) ABSTRACT

A method for joint configuration of power and channel of a WLAN is provided, including: selecting transmitting power of each AP from transmitting power ranges of APs of a WLAN to form an AP transmitting power combination; determining a set of AP operating channel combinations corresponding to each AP transmitting power combination according to operating channels of the APs in the WLAN; calculating an estimated load of each AP corresponding to each AP operating channel combination corresponding to each AP transmitting power combination, and calculating KPIs of the WLAN corresponding to each AP operating channel combination according to the estimated load of each AP; and selecting, according to the calculated KPIs, an optimal channel configuration scheme of the WLAN corresponding to each AP transmitting power combination, and selecting an optimal power and channel configuration scheme of the WLAN, thereby improving throughput and resource utilization efficiency of the WLAN.

20 Claims, 4 Drawing Sheets

(51) Int. Cl.
*H04W 52/02* (2009.01)
*H04W 52/24* (2009.01)
*H04W 24/02* (2009.01)
*H04W 52/14* (2009.01)
*H04W 52/36* (2009.01)
*H04W 84/12* (2009.01)
*H04W 88/08* (2009.01)

(52) U.S. Cl.
CPC ............ *H04W 84/12* (2013.01); *H04W 88/08* (2013.01); *Y02B 60/50* (2013.01)

METHOD AND APPARATUS FOR JOINT CONFIGURATION OF POWER AND CHANNEL OF WLAN

CROSS-REFERENCE TO RELATED APPLICATION

This application is a continuation of International Patent Application No. PCT/CN2013/085491, filed on Oct. 18, 2013, which is hereby incorporated by reference in its entirety.

TECHNICAL FIELD

The present disclosure relates to communication technologies and, in particular, to a method and an apparatus for joint configuration of power and channel of a WLAN.

BACKGROUND

Spectrum regulation and power optimization are important research topics for a wireless network, which mainly aim at maximizing system throughput, and meanwhile taking coverage into consideration. A basic method for current spectrum regulation and power optimization is to allocate more resources (including a spectrum (a channel) and power) to a cell requiring more services, and avoid producing too much interference to a region requiring more services from a region requiring less services. In a wireless local access network (WLAN) network, the number of available orthogonal channels is limited, there may be co-channel interference in adjacent regions, besides, due to a carrier sensing mechanism specially owned by the WLAN, interference from an adjacent region may have great impacts on network throughput of a target region. In addition, the WLAN uses an industrial, scientific and medical (ISM) frequency band, which is easily suffered from external interference, besides, due to dynamic nature of user loads, the requirement for spectrum (channel) and power optimization of an access point (AP) increases frequently, thus configuration and optimization of power and channel of the WLAN become an urgent problem.

A first example in conventional art is mainly used to solve a problem of automatically configuring an available channel and power of an AP according to different management practices of the WLAN of different countries and regions. The AP in this first example acquires network coding information through an operator to which it belongs, and determine an available channel and a power parameter according to the network coding information, thereby completing automatic configuration of the channel and the power parameter of the device. The AP in this first example automatically configures maximum transmitting power and an available channel, which does not involve power adjustment and channel allocation, thus joint configuration and optimization of power and channel cannot be implemented.

A second example in conventional art is mainly used to solve a problem of power adjustment of an AP during network operation, and an access controller in the second example can adjust power of the access controller according to a load and interference of a target region, the second example is a power adjusting scheme based on a single base station without considering impacts from an adjacent region, therefore, impacts on performance of whole network from such an adjusting mode are unpredictable, moreover, channel adjustment is not taken into consideration in the second example, thus joint configuration and optimization of power and channel cannot be implemented.

SUMMARY

Embodiments of the present disclosure provide a method and an apparatus for joint configuration of power and channel of a WLAN, which can rapidly find an optimal power and channel configuration scheme of the WLAN, thereby improving power and channel adjusting efficiency of the WLAN, improving throughput and resource utilization of the WLAN, and increasing user stickiness of the WLAN network.

In a first aspect, an embodiment of the present disclosure provides a method for joint configuration of power and channel of a WLAN, which may include:

selecting transmitting power of each AP from transmitting power ranges of access points APs of a wireless local area network WLAN to form an AP transmitting power combination, where, there are a plurality of the AP transmitting power combinations, and each of the AP transmitting power combinations includes the transmitting power of each AP;

determining a set of AP operating channel combinations corresponding to each AP transmitting power combination according to operating channels of the APs in the WLAN, where the set of AP operating channel combinations includes a plurality of AP operating channel combinations;

calculating an estimated load of each AP corresponding to each AP operating channel combination in the set of AP operating channel combinations corresponding to each AP transmitting power combination, and calculating key performance indicators KPIs of the WLAN corresponding to each AP operating channel combination according to the estimated load of each AP; and selecting, according to the calculated KPIs of the WLAN, an optimal channel configuration scheme of the WLAN corresponding to each AP transmitting power combination, and selecting an optimal power and channel configuration scheme of the WLAN from the optimal channel configuration schemes of the WLAN corresponding to all AP transmitting power combinations.

With reference to the first aspect, in a first possible implementation, before the selecting the transmitting power of each AP from the transmitting power ranges of the access points APs of the wireless local area network WLAN to form the AP transmitting power combination, including:

dividing a coverage area of each of the APs of the WLAN into a plurality of sub areas, and setting a statistical cycle for services or power of the sub areas; and regularly receiving, according to the statistical cycle, average service requirements, useful power, interference power and average channel detection thresholds of the sub areas of the coverage areas of the APs of the WLAN as obtained by the APs through statistics;

where the useful power is average receiving power received by a user of the sub areas from its serving AP, and the interference power is average receiving power received by a user of the sub areas from adjacent APs.

With reference to the first aspect or the first possible implementation of the first aspect, in a second possible implementation, during a process of calculating the estimated load of each AP corresponding to each AP operating channel combination in the set of AP operating channel combinations corresponding to each AP transmitting power combination, when calculating an estimated load of any AP ($AP_c$) corresponding to any AP operating channel combination in a set of AP operating channel combinations corresponding to a specific AP transmitting power combination (an AP transmitting power combination x), including:

calculating a signal to interference plus noise ratio or a signal to noise ratio of a sub area i, according to transmitting power of APs in the AP transmitting power combination x, noise power of the sub area i of a coverage area of the $AP_c$ and operating channels of APs in an AP operating channel combination corresponding to the AP transmitting power combination x and by combining with a channel gain from the sub area i to the $AP_c$ or channel gains from the sub area i to adjacent APs ($AP_d$s);

calculating a required transmission duration corresponding to an average service requirement of the sub area i, according to the signal to interference plus noise ratio or the signal to noise ratio of the sub area i and by combining with a channel bandwidth and the average service requirement of the sub area i;

calculating a total transmission duration required by all users of the $AP_c$ according to the required transmission duration corresponding to the average service requirement of the sub area i and by combining with signal interference or competition interference of the sub area i;

calculating a total transmission duration available for the $AP_c$ corresponding to a nominal rate of the $AP_c$, according to an average obtainable rate of the $AP_c$ and a protocol efficiency factor of a media access control MAC layer of the $AP_c$ and by combining with the nominal rate of the $AP_c$; and calculating an estimated load of the $AP_c$ according to the total transmission duration required by all users of the $AP_c$ and the total transmission duration available for the $AP_c$ corresponding to the nominal rate of the $AP_c$.

With reference to the second possible implementation of the first aspect, in a third possible implementation, the channel gain from the sub area i to the $AP_c$ is a ratio of average receiving power, which is from the $AP_c$, of the sub area i to transmitting power of the $AP_c$; and the channel gain from the sub area i to the $AP_d$ is a ratio of average receiving power, which is from the $AP_d$, of the sub area i to transmitting power of the $AP_d$.

With reference to the second possible implementation of the first aspect, in a fourth possible implementation, the calculating the signal to interference plus noise ratio or the signal to noise ratio of the sub area i by combining with the channel gain from the sub area i to the $AP_c$ or the channel gains from the sub area i to the adjacent APs ($AP_d$s), includes:

when the average receiving power, which is from the $AP_d$, of the sub area i is less than an average channel detection threshold of the sub area i, calculating the signal to interference plus noise ratio of the sub area i by combining with the channel gain from the sub area i to the $AP_c$ and the channel gain from the sub area i to the $AP_d$; or when the average receiving power, which is from the adjacent APs (the $AP_d$s), of the sub area i is greater than or equal to the average channel detection threshold of the sub area i, calculating the signal to noise ratio of the sub area i by combining with the channel gain from the sub area i to the $AP_c$.

With reference to the second possible implementation of the first aspect, in a fifth possible implementation, the calculating the required transmission duration corresponding to the average service requirement of the sub area i, according to the signal to interference plus noise ratio or the signal to noise ratio of the sub area i and by combining with the channel bandwidth and the average service requirement of the sub area i, includes:

calculating an obtainable rate of the sub area i according to the signal to interference plus noise ratio or the signal to noise ratio of the sub area i and by combining with the channel bandwidth of the sub area i;

calculating the required transmission duration corresponding to the average service requirement of the sub area i, according to the average service requirement of the sub area i and by combining with the obtainable rate of the sub area i.

With reference to the fifth possible implementation of the first aspect, in a sixth possible implementation, the calculating the total transmission duration required by all users of the $AP_c$, according to the required transmission duration corresponding to the average service requirement of the sub area i and by combining with the signal interference or the competition interference of the sub area i, includes:

when the average receiving power, which is from the adjacent APs, of the sub area i is less than an average channel detection threshold of the sub area i, calculating a sum of required transmission durations corresponding to average service requirements of all sub areas of a coverage area of the $AP_c$, that is, the total transmission duration required by all users of the $AP_c$; or when the average receiving power, which is from the adjacent APs, of the sub area i is greater than or equal to an average channel detection threshold of the sub area i, calculating a sum of required transmission durations corresponding to average service requirements of all sub areas of a coverage area of the $AP_c$, plus transmission durations of all users of the adjacent APs, that is, the total transmission duration required by all users of the $AP_c$.

With reference to any possible implementation from the third possible implementation of the first aspect to the sixth possible implementation of the first aspect, in a seventh possible implementation, the KPIs of the WLAN include: user dissatisfaction of the whole network of the WLAN, a service disruption ratio of the whole network of the WLAN, an average load of the whole network of the WLAN and distribution of signal to interference plus noise ratios or signal to noise ratios of the whole network of the WLAN.

With reference to the seventh possible implementation of the first aspect, in an eighth possible implementation, when the KPI of the WLAN is the user dissatisfaction of the WLAN, the calculating the key performance indicator KPI of the WLAN corresponding to each AP operating channel combination according to the estimated load of each AP includes:

calculating the user dissatisfaction of the WLAN corresponding to each AP operating channel combination according to the estimated load of each AP corresponding to each AP operating channel combination, quantity of users of each AP and quantity of APs of the whole network of the WLAN.

With reference to the seventh possible implementation of the first aspect, in a ninth possible implementation, when the KPI of the WLAN is the service disruption ratio of the WLAN, the calculating the key performance indicator KPI of the WLAN corresponding to each AP operating channel combination according to the estimated load of each AP includes:

calculating the service disruption ratio of the WLAN corresponding to each AP operating channel combination according to the estimated load of each AP corresponding to each AP operating channel combination, quantity of users of each AP, status of a previous operating channel and a newly-allocated operating channel of each AP and quantity of APs in the whole network of the WLAN.

With reference to the seventh possible implementation of the first aspect, in a tenth possible implementation, when the KPI of the WLAN is the distribution of the signal to interference plus noise ratios or the signal to noise ratios of the WLAN, the calculating the key performance indicator KPI of the WLAN corresponding to each AP operating channel combination according to the estimated load of each AP includes:

accumulating distribution of signal to interference plus noise ratios or signal to noise ratios of each AP corresponding to each AP operating channel combination, and combining with a total number of APs of the whole network of the WLAN, calculating the distribution of the signal to interference plus noise ratios or the signal to noise ratios of the whole network of the WLAN corresponding to each AP operating channel combination.

With reference to the seventh possible implementation of the first aspect, in an eleventh possible implementation, the calculating the key performance indicator KPI of the WLAN corresponding to each AP operating channel combination according to the estimated load of each AP also includes:

accumulating the estimated load of each AP corresponding to each AP operating channel combination, and combining with a total number of APs in the whole network of the WLAN, calculating the average load of the whole network of the WLAN corresponding to each AP operating channel combination.

With reference to any possible implementation from the seventh possible implementation of the first aspect to the eleventh possible implementation of the first aspect, in a twelfth possible implementation, the selecting, according to the calculated KPIs of the WLAN, the optimal channel configuration scheme of the WLAN corresponding to each AP transmitting power combination includes:

treating the user dissatisfaction and the average load of the whole network of the WLAN corresponding to each AP operating channel combination in the set of AP operating channel combinations corresponding to each AP transmitting power combination as optimization objectives, and acquiring a set of channel configuration schemes with optimal optimization objectives corresponding to each AP transmitting power combination; and calculating the service disruption ratio of the whole network of the WLAN corresponding to each configuration scheme in the set of channel configuration schemes with the optimal optimization objectives corresponding to each AP transmitting power combination, and selecting, from the set of channel configuration schemes with the optimal optimization objectives corresponding to each AP transmitting power combination, a configuration scheme of which the service disruption ratio is lowest as the optimal channel configuration scheme of the WLAN corresponding to each AP transmitting power combination.

With reference to the twelfth possible implementation of the first aspect, in a thirteenth possible implementation, the selecting the optimal power and channel configuration scheme of the WLAN from the optimal channel configuration schemes of the WLAN corresponding to all AP transmitting power combinations includes:

selecting, from the optimal channel configuration schemes of the WLAN corresponding to all AP transmitting power combinations, an AP transmitting power combination of which the service disruption ratio of the whole network of the WLAN is lowest, and selecting the AP transmitting power combination and the corresponding optimal channel combination as the optimal power and channel configuration scheme of the WLAN.

In a second aspect, an embodiment of the present disclosure provides an apparatus for joint configuration of power and channel of a WLAN, which may include:

a power determining module, configured to select transmitting power of each AP from transmitting power ranges of APs of a WLAN to form an AP transmitting power combination, wherein, there are a plurality of the AP transmitting power combinations, and each of the AP transmitting power combinations comprises the transmitting power of each AP;

a channel determining module, configured to determine a set of AP operating channel combinations corresponding to each AP transmitting power combination according to operating channels of the APs in the WLAN, where the set of AP operating channel combinations includes a plurality of AP operating channel combinations;

a parameter acquiring module, configured to calculate an estimated load of each AP corresponding to each AP operating channel combination in the set of AP operating channel combinations corresponding to each AP transmitting power combination, and calculate KPIs of the WLAN corresponding to each AP operating channel combination according to the estimated load of each AP; and a configuration module, configured to select, according to the calculated KPIs of the WLAN, an optimal channel configuration scheme of the WLAN corresponding to each AP transmitting power combination, and select an optimal power and channel configuration scheme of the WLAN from the optimal channel configuration schemes of the WLAN corresponding to all AP transmitting power combinations.

With reference to the second aspect, in a first possible implementation, the apparatus also includes:

a statistics module, configured to divide a coverage area of each of the APs of the WLAN into a plurality of sub areas, and set a statistical cycle for services or power of the sub areas; and regularly receive, according to the statistical cycle, average service requirements, useful power, interference power and average channel detection thresholds of the sub areas of the coverage areas of the APs of the WLAN as obtained by the APs through statistics;

where the useful power is average receiving power received by a user of the sub areas from its serving AP, and the interference power is average receiving power received by a user of the sub areas from adjacent APs.

With reference to the second aspect or the first possible implementation of the second aspect, in a second possible implementation, the parameter acquiring module includes:

a load estimating sub module, configured to calculate the estimated load of each AP corresponding to each AP operating channel combination in the set of AP operating channel combinations corresponding to each AP transmitting power combination; and a parameter calculating sub module, configured to calculate the KPIs of the WLAN corresponding to each AP operating channel combination according to the estimated load of each AP.

With reference to the second possible implementation of the second aspect, in a third possible implementation, the load estimating sub module includes:

a first calculating unit, configured to calculate a signal to interference plus noise ratio or a signal to noise ratio of a sub area i, according to transmitting power of APs in a specific AP transmitting power combination (the AP transmitting power combination x), noise power of the sub area i of a coverage area of a specific AP ($AP_c$) corresponding to the AP transmitting power combination x and operating channels of APs in an AP operating channel combination corresponding to the AP transmitting power combination x and by combining with a channel gain from the sub area i to the $AP_c$ or channel gains from the sub area i to adjacent APs ($AP_d$s);

a second calculating unit, configured to calculate a required transmission duration corresponding to an average service requirement of the sub area i, according to the signal to interference plus noise ratio or the signal to noise ratio of the sub area i and by combining with a channel bandwidth and the average service requirement of the sub area i;

a third calculating unit, configured to calculate a total transmission duration required by all users of the $AP_c$, according to the required transmission duration corresponding to the average service requirement of the sub area i and by combining with signal interference or competition interference of the sub area i;

a fourth calculating unit, configured to calculate a total transmission duration available for the $AP_c$ corresponding to a nominal rate of the $AP_c$, according to an average obtainable rate of the $AP_c$ and a protocol efficiency factor of a media access control MAC layer of the $AP_c$ and by combining with the nominal rate of the $AP_c$; and a fifth calculating unit, configured to calculate an estimated load of the $AP_c$ according to the total transmission duration required by all users of the $AP_c$ and the total transmission duration available for the $AP_c$ corresponding to the nominal rate of the $AP_c$.

With reference to the third possible implementation of the second aspect, in a fourth possible implementation, the channel gain from the sub area i to the $AP_c$ is a ratio of average receiving power, which is from the $AP_c$, of the sub area i to transmitting power of the AP; and the channel gain from the sub area i to the $AP_d$ is a ratio of average receiving power, which is from the $AP_d$, of the sub area i to transmitting power of the $AP_d$.

With reference to the third possible implementation of the second aspect, in a fifth possible implementation, the second calculating unit includes:

a rate calculating sub unit, configured to calculate the obtainable rate of the sub area i according to the signal to interference plus noise ratio or the signal to noise ratio of the sub area i and by combining with the channel bandwidth of the sub area i;

a time duration calculating sub unit, configured to calculate the required transmission duration corresponding to the average service requirement of the sub area i, according to the average service requirement of the sub area i and by combining with the obtainable rate of the sub area i.

With reference to the third possible implementation of the second aspect, in a sixth possible implementation, when calculating the total transmission duration required by all users of the $AP_c$, according to the required transmission duration corresponding to the average service requirement of the sub area i and by combining with the signal interference or the competition interference of the sub area i, the third calculating unit is configured to:

when the average receiving power, which is from the adjacent APs, of the sub area i is less than an average channel detection threshold of the sub area i, calculating a sum of required transmission durations corresponding to average service requirements of all sub areas of a coverage area of the $AP_c$, that is, the total transmission duration required by all users of the $AP_c$; or when the average receiving power, which is from the adjacent APs, of the sub area i is greater than or equal to an average channel detection threshold of the sub area i, calculating a sum of required transmission durations corresponding to average service requirements of all sub areas of a coverage area of the $AP_c$, plus transmission durations of all users of the adjacent APs, that is, the total transmission duration required by all users of the $AP_c$.

With reference to any possible implementation from the third possible implementation of the second aspect to the sixth possible implementation of the second aspect, in a seventh possible implementation, the KPIs of the WLAN include: user dissatisfaction of the whole network of the WLAN, a service disruption ratio of the whole network of the WLAN, an average load of the whole network of the WLAN and distribution of signal to interference plus noise ratios or signal to noise ratios of the whole network of the WLAN.

With reference to the seventh possible implementation of the second aspect, in an eighth possible implementation, when the KPI of the WLAN is the user dissatisfaction of the WLAN, when calculating the KPI of the WLAN corresponding to each AP operating channel combination according to the estimated load of each AP, the parameter calculating sub module is configured to:

calculate the user dissatisfaction of the WLAN corresponding to each AP transmitting power combination according to the estimated load of each AP corresponding to each AP operating channel combination, quantity of users of each AP and quantity of APs of the whole network of the WLAN.

With reference to the seventh possible implementation of the second aspect, in a ninth possible implementation, when the KPI of the WLAN is the service disruption ratio of the WLAN, when calculating the KPI of the WLAN corresponding to each AP operating channel combination according to the estimated load of each AP, the parameter calculating sub module is configured to:

calculate the service disruption ratio of the WLAN corresponding to each AP operating channel combination according to the estimated load of each AP corresponding to each AP operating channel combination, quantity of users of each AP, status of a previous operating channel and a newly-allocated operating channel of each AP and quantity of APs in the whole network of the WLAN.

With reference to the seventh possible implementation of the second aspect, in a tenth possible implementation, when the KPI of the WLAN is the distribution of the signal to interference plus noise ratios or the signal to noise ratios of the WLAN, when calculating the key performance indicator KPI of the WLAN corresponding to each AP operating channel combination according to the estimated load of each AP, the parameter calculating sub module is configured to:

accumulate distribution of signal to interference plus noise ratios or signal to noise ratios of each AP corresponding to each AP operating channel combination, and combine with a total number of APs of the whole network of the WLAN, calculate the distribution of the signal to interference plus noise ratios or the signal to noise ratios of the whole network of the WLAN corresponding to each AP operating channel combination.

With reference to the seventh possible implementation of the second aspect, in an eleventh possible implementation, when calculating the key performance indicator KPIs of the WLAN corresponding to each AP operating channel combination according to the estimated load of each AP, the parameter calculating sub module is also configured to:

accumulate the estimated load of each AP corresponding to each AP operating channel combination, and combine with a total number of APs in the whole network of the WLAN, calculate the average load of the whole network of the WLAN corresponding to each AP operating channel combination.

With reference to any possible implementation from the seventh possible implementation of the second aspect to the eleventh possible implementation of the second aspect, in a twelfth possible implementation, the configuration module includes:

an individual configuration selecting sub module, configured to select an optimal channel configuration scheme of the WLAN corresponding to each AP transmitting power combination according to the calculated KPIs of the WLAN; and an integrated configuration selecting sub module, configured to select, from the optimal channel configuration schemes of the WLAN corresponding to all AP transmitting power combinations, an optimal power and channel configuration scheme of the WLAN.

With reference to the twelfth possible implementation of the second aspect, in a thirteenth possible implementation, the individual configuration selecting sub module includes:

an acquiring unit, configured to treat the user dissatisfaction and the average load of the whole network of the WLAN corresponding to each AP operating channel combination in the set of AP operating channel combinations corresponding to each AP transmitting power combination as optimization objectives, and acquire a set of channel configuration schemes with optimal optimization objectives corresponding to each AP transmitting power combination; and a selecting unit, configured to calculate the service disruption ratio of the whole network of the WLAN corresponding to each configuration scheme in the set of channel configuration schemes with the optimal optimization objectives corresponding to each AP transmitting power combination, and select, from the set of channel configuration schemes with the optimal optimization objectives corresponding to each AP transmitting power combination, a configuration scheme of which the service disruption ratio is lowest as the optimal channel configuration scheme of the WLAN corresponding to each AP transmitting power combination.

With reference to the thirteenth possible implementation of the second aspect, in a fourteenth possible implementation, when selecting the optimal power and channel configuration scheme of the WLAN from the optimal channel configuration schemes of the WLAN corresponding to all AP transmitting power combinations, the integrated configuration selecting sub module is configured to:

select, from the optimal channel configuration schemes of the WLAN corresponding to all AP transmitting power combinations, an AP transmitting power combination of which the service disruption ratio of the whole network of the WLAN is lowest, and select the AP transmitting power combination and the corresponding optimal channel combination as the optimal power and channel configuration scheme of the WLAN.

In a third aspect, an embodiment of the present disclosure provides a controller, which may include:

a memory, configured to store an instruction;

a processor, configured to read the instruction from the memory, and perform, according to the instruction, operations of: selecting transmitting power of each AP from transmitting power ranges of APs of a WLAN to form an AP transmitting power combination, wherein, there are a plurality of the AP transmitting power combinations, and each of the AP transmitting power combinations comprises the transmitting power of each AP; and determining a set of AP operating channel combinations corresponding to each AP transmitting power combination according to operating channels of the APs in the WLAN, wherein the set of AP operating channel combinations comprises a plurality of AP operating channel combinations; calculating an estimated load of each AP corresponding to each AP operating channel combination in the set of AP operating channel combinations corresponding to each AP transmitting power combination, and calculating KPIs of the WLAN corresponding to each AP operating channel combination according to the estimated load of each AP; and selecting, according to the calculated KPIs of the WLAN, an optimal channel configuration scheme of the WLAN corresponding to each AP transmitting power combination, and selecting an optimal power and channel configuration scheme of the WLAN from the optimal channel configuration schemes of the WLAN corresponding to all AP transmitting power combinations.

With reference to the third aspect, in a first possible implementation, before selecting the transmitting power of each AP from the transmitting power ranges of the access points APs of the wireless local area network WLAN to form the AP transmitting power combination, the processor is also configured to:

divide a coverage area of each of the APs of the WLAN into a plurality of sub areas, and setting a statistical cycle for services or power of the sub areas; and regularly receive, according to the statistical cycle, average service requirements, useful power, interference power and average channel detection thresholds of the sub areas of the coverage areas of the APs of the WLAN as obtained by the APs through statistics;

where the useful power is average receiving power received by a user of the sub areas from its serving AP, and the interference power is average receiving power received by a user of the sub areas from adjacent APs.

With reference to the third aspect or the first possible implementation of the third aspect, in a second possible implementation, during a process of calculating the estimated load of each AP corresponding to each AP operating channel combination in the set of AP operating channel combinations corresponding to each AP transmitting power combination, when calculating an estimated load of any AP ($AP_c$) corresponding to any AP operating channel combination in a set of AP operating channel combinations corresponding to a specific AP transmitting power combination (an AP transmitting power combination x), the processor is configured to:

calculate a signal to interference plus noise ratio or a signal to noise ratio of a sub area i, according to transmitting power of APs in the AP transmitting power combination x, noise power of the sub area i of a coverage area of the $AP_c$ and operating channels of APs in an AP operating channel combination corresponding to the AP transmitting power combination x and by combining with a channel gain from the sub area i to the $AP_c$ or channel gains from the sub area i to adjacent APs ($AP_a$s);

calculate a required transmission duration corresponding to an average service requirement of the sub area i, according to the signal to interference plus noise ratio or the signal to noise ratio of the sub area i and by combining with a channel bandwidth and the average service requirement of the sub area i;

calculate a total transmission duration required by all users of the $AP_c$, according to the required transmission duration corresponding to the average service requirement of the sub area i and by combining with signal interference or competition interference of the sub area i;

calculate a total transmission duration available for the $AP_c$ corresponding to a nominal rate of the $AP_c$, according to an average obtainable rate of the $AP_c$ and a protocol efficiency factor of a media access control MAC layer of the $AP_c$ and by combining with the nominal rate of the $AP_c$; and calculate an estimated load of the $AP_c$ according to the total transmission duration required by all users of the $AP_c$ and the total transmission duration available for the $AP_c$ corresponding to the nominal rate of the $AP_c$.

With reference to the second possible implementation of the third aspect, in a third possible implementation, the channel gain from the sub area i to the $AP_c$ is a ratio of average receiving power, which is from the $AP_c$, of the sub area i to transmitting power of the $AP_c$; and the channel gain from the sub area i to the $AP_d$ is a ratio of average receiving power, which is from the $AP_d$, of the sub area i to transmitting power of the $AP_d$.

With reference to the second possible implementation of the third aspect, in a fourth possible implementation, when calculating the signal to interference plus noise ratio or the signal to noise ratio of the sub area i by combining with the channel gain from the sub area i to the $AP_c$ or the channel gains from the sub area i to the adjacent APs ($AP_d$s), the processor is configured to:

when the average receiving power, which is from the $AP_d$, of the sub area i is less than an average channel detection threshold of the sub area i, calculate the signal to interference plus noise ratio of the sub area i by combining with the channel gain from the sub area i to the $AP_c$ and the channel gain from the sub area i to the $AP_d$; or when the average receiving power, which is from the adjacent APs (the $AP_d$s), of the sub area i is greater than or equal to the average channel detection threshold of the sub area i, calculate the signal to noise ratio of the sub area i by combining with the channel gain from the sub area i to the $AP_c$.

With reference to the second possible implementation of the third aspect, in a fifth possible implementation, when calculating the required transmission duration corresponding to the average service requirement of the sub area i, according to the signal to interference plus noise ratio or the signal to noise ratio of the sub area i and by combining with the channel bandwidth and the average service requirement of the sub area i, the processor is configured to:

calculate an obtainable rate of the sub area i according to the signal to interference plus noise ratio or the signal to noise ratio of the sub area i and by combining with the channel bandwidth of the sub area i;

calculate the required transmission duration corresponding to the average service requirement of the sub area i, according to the average service requirement of the sub area i and by combining with the obtainable rate of the sub area i.

With reference to the fifth possible implementation of the third aspect, in a sixth possible implementation, when calculating the total transmission duration required by all users of the $AP_c$, according to the required transmission duration corresponding to the average service requirement of the sub area i and by combining with the signal interference or the competition interference of the sub area i, the processor is configured to:

when the average receiving power, which is from the adjacent APs, of the sub area i is less than an average channel detection threshold of the sub area i, calculate a sum of required transmission durations corresponding to average service requirements of all sub areas of a coverage area of the $AP_c$, that is, the total transmission duration required by all users of the $AP_c$; or when the average receiving power, which is from the adjacent APs, of the sub area i is greater than or equal to an average channel detection threshold of the sub area i, calculate a sum of required transmission durations corresponding to average service requirements of all sub areas of a coverage area of the $AP_c$, plus transmission durations of all user of the adjacent APs, that is, the total transmission duration required by all users of the $AP_c$.

With reference to any possible implementation from the third possible implementation of the third aspect to the sixth possible implementation of the third aspect, in a seventh possible implementation, the KPIs of the WLAN include: user dissatisfaction of the whole network of the WLAN, a service disruption ratio of the whole network of the WLAN, an average load of the whole network of the WLAN and distribution of signal to interference plus noise ratios or signal to noise ratios of the whole network of the WLAN.

With reference to the seventh possible implementation of the third aspect, in an eighth possible implementation, when the KPI of the WLAN is the user dissatisfaction of the WLAN, when calculating the KPI of the WLAN corresponding to each AP operating channel combination according to the estimated load of each AP, the processor is configured to:

calculate the user dissatisfaction of the WLAN corresponding to each AP operating channel combination according to the estimated load of each AP corresponding to each AP operating channel combination, quantity of users of each AP and quantity of APs of the whole network of the WLAN.

With reference to the seventh possible implementation of the third aspect, in a ninth possible implementation, when the KPI of the WLAN is the service disruption ratio of the WLAN, when calculating the KPI of the WLAN corresponding to each AP operating channel combination according to the estimated load of each AP, the processor is configured to:

calculate the service disruption ratio of the WLAN corresponding to each AP operating channel combination according to the estimated load of each AP corresponding to each AP operating channel combination, quantity of users of each AP, status of a previous operating channel and a newly-allocated operating channel of each AP and quantity of APs of the whole network of the WLAN.

With reference to the seventh possible implementation of the third aspect, in a tenth possible implementation, when the KPI of the WLAN is the distribution of the signal to interference plus noise ratios or the signal to noise ratios of the WLAN, when calculating the KPI of the WLAN corresponding to each AP operating channel combination according to the estimated load of each AP, the processor is configured to:

accumulate distribution of signal to interference plus noise ratios or signal to noise ratios of each AP corresponding to each AP operating channel combination, and combine with a total number of APs of the whole network of the WLAN, calculate the distribution of the signal to interference plus noise ratios or the signal to noise ratios of the whole network of the WLAN corresponding to each AP operating channel combination.

With reference to the seventh possible implementation of the third aspect, in an eleventh possible implementation, when calculating the KPI of the WLAN corresponding to each AP operating channel combination according to the estimated load of each AP, the processor is also configured to:

accumulate the estimated load of each AP corresponding to each AP operating channel combination, and combine with a total number of APs in the whole network of the WLAN, calculate the average load of the whole network of the WLAN corresponding to each AP operating channel combination.

With reference to any possible implementation from the seventh possible implementation of the third aspect to the eleventh possible implementation of the third aspect, in a twelfth possible implementation, when selecting, according to the calculated KPIs of the WLAN, the optimal power and channel configuration scheme of the WLAN corresponding to each AP transmitting power combination, the processor is configured to:

treat the user dissatisfaction and the average load of the whole network of the WLAN corresponding to each AP operating channel combination in the set of AP operating channel combinations corresponding to each AP transmitting power combination as optimization objectives, and acquire a set of channel configuration schemes with optimal optimization objectives corresponding to each AP transmitting power combination; and calculate the service disruption ratio of the whole network of the WLAN corresponding to each configuration scheme in the set of channel configuration schemes with the optimal optimization objectives corresponding to each AP transmitting power combination, and select, from the set of channel configuration schemes with the optimal optimization objectives corresponding to each AP transmitting power combination, a configuration scheme of which the service disruption ratio is lowest as the optimal channel configuration scheme of the WLAN corresponding to each AP transmitting power combination.

With reference to the twelfth possible implementation of the third aspect, in a thirteenth possible implementation, when selecting the optimal power and channel configuration scheme of the WLAN from the optimal channel configuration schemes of the WLAN corresponding to all AP transmitting power combinations, the processor is configured to:

select, from the optimal channel configuration schemes of the WLAN corresponding to all AP transmitting power combinations, an AP transmitting power combination of which the service disruption ratio of the whole network of the WLAN is lowest, and select the AP transmitting power combination and the corresponding optimal channel combination as the optimal power and channel configuration scheme of the WLAN.

By means of calculating estimated loads and KPIs of APs in a WLAN, selecting a power and channel configuration scheme of the WLAN by combining with the KPIs of the WLAN, selecting an optimal channel configuration scheme of the WLAN corresponding to all AP transmitting power combinations according to AP transmitting power combinations and a set of corresponding AP operating channel combinations and selecting an optimal configuration scheme therefrom, embodiments of the present disclosure can rapidly find an optimal power and channel configuration scheme of a WLAN, thereby improving power and channel adjusting efficiency of the WLAN, improving throughput and resource utilization of the WLAN, and increasing user stickiness of the WLAN network.

BRIEF DESCRIPTION OF DRAWINGS

In order to describe technical solutions in embodiments of the present disclosure more clearly, accompanying drawings used in the description of embodiments of the present disclosure will be briefly described hereunder. Obviously, the described drawings are merely some embodiments of the present disclosure. For persons skilled in the art, other drawings may be obtained based on these drawings without any creative effort.

DESCRIPTION OF EMBODIMENTS

Technical solutions in embodiments of the present disclosure will be described hereunder clearly and completely with reference to the accompanying drawings in embodiments of the present disclosure. Obviously, the described embodiments are only a part of embodiments of the present disclosure, rather than all embodiments of the present disclosure. All other embodiments obtained by persons of ordinary skill in the art based on the embodiments of the present disclosure without any creative effort shall fall into the protection scope of the present disclosure.

Figure 1:
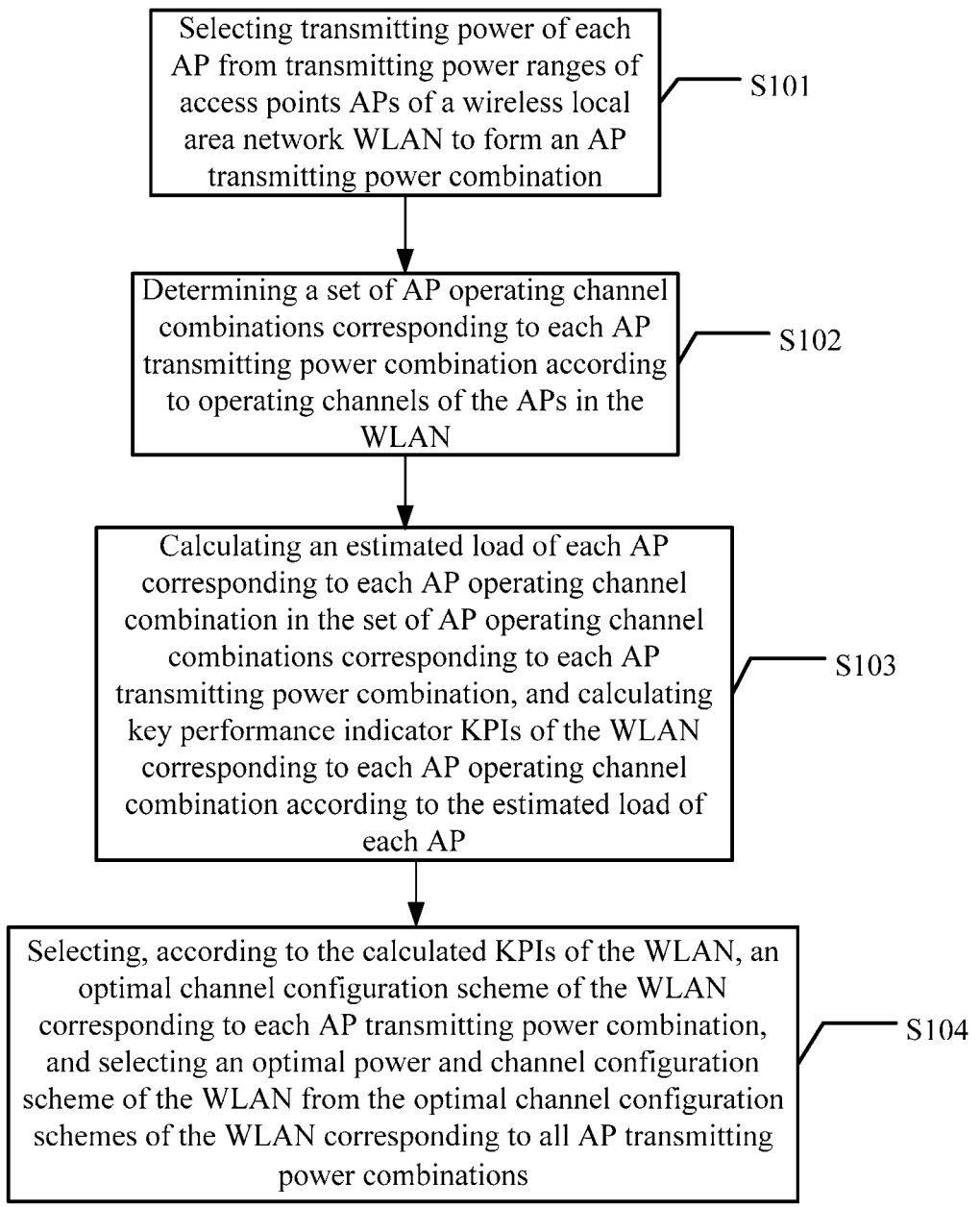
FIG. 1 is a schematic flow chart of a method for joint configuration of power and channel of a WLAN according to an embodiment of the present disclosure.

Reference may be made to FIG. 1, which is a schematic flow chart of a method for joint configuration of power and channel of a WLAN according to an embodiment of the present disclosure. A method for joint configuration of power and channel of a WLAN described in this embodiment includes steps of:

S101, selecting transmitting power of each AP from transmitting power ranges of access points APs of a wireless local area network WLAN to form an AP transmitting power combination.

S102, determining a set of AP operating channel combinations corresponding to each AP transmitting power combination according to operating channels of the APs in the WLAN.

In some practicable implementations, the WLAN network described in embodiments of the present disclosure may include a plurality of APs, and each AP has its own coverage area, there are a plurality of AP transmitting power combinations, and each AP transmitting power combination includes the transmitting power of each AP in the WLAN described above. In a specific implementation, transmitting power of each AP may be selected according to transmitting power ranges of APs in the WLAN, that is, a specific transmitting power value of a specific AP may be selected from a transmitting power range of the AP, and the selected transmitting power of each AP is joint to form an AP transmitting power combination. Specifically, a plurality of transmitting power may be selected for each AP, and selected transmitting power of APs is joint into a set of transmitting power combinations, where the set of transmitting power combinations above may include a plurality of AP transmitting power combinations.

After an AP transmitting power combination is selected, a set of AP operating channel combinations corresponding to the AP transmitting power combination may be determined according to information about operating channels of the APs in the AP transmitting power combination, where the set of AP operating channel combinations may include a plurality of AP operating channel combinations, that is, all AP operating channel combinations corresponding to the AP transmitting power combination may be determined. After the AP transmitting power combination and the set of corresponding AP operating channel combinations are determined, then an estimated load of each AP corresponding to each AP operating channel combination may be calculated according to the transmitting power combination.

S103, calculating an estimated load of each AP corresponding to each AP operating channel combination in the set of AP operating channel combinations corresponding to each AP transmitting power combination, and calculating key performance indicators KPIs of the WLAN corresponding to each AP operating channel combination according to the estimated load of each AP.

In some practicable implementations, a coverage area of each AP in the WLAN may be divided into a plurality of sub areas firstly, and a statistical cycle may be set for services or power of each sub area. After statistical cycles are set for services or power of sub areas, then an average service requirement, useful power, interference power and an average channel detection threshold of each sub area as obtained by each AP through regularly statistics according to the statistical cycle may be received. Specifically, useful power of a specific sub area in the sub areas is mainly average receiving power received by a user of the sub area from its serving AP, for instance, useful power of a sub area i (the sub area i is one of sub areas divided from a coverage area of an $AP_c$, where the $AP_c$ is any one of a plurality of APs of the WLAN) is mainly average receiving power received by a user of the sub area i from the $AP_c$. Interference power of a specific sub area in the sub areas is average receiving power received by a user of the sub area from adjacent APs, for instance, interference power of the sub area i is mainly average receiving power received by a user of the sub area i from adjacent APs.

In a specific implementation, after the average service requirement, the useful power and the interference power of the coverage areas of the APs in the WLAN network are obtained through statistics, and joint with the selected AP transmitting power combination and the corresponding AP operating channel combination, then estimated loads of the APs in the AP transmitting power combination may be calculated.

In some practicable implementations, after the set of AP transmitting power combinations is determined, then an AP transmitting power combination may be selected therefrom, and estimated loads of APs corresponding to the AP transmitting power combination is calculated according to a set of AP operating channel combinations corresponding to the AP transmitting power combination. Specifically, when calculating estimated loads of APs corresponding to a specific AP transmitting power combination, an AP operating channel combination may be selected from a set of AP operating channel combinations corresponding to the AP transmitting power combination firstly, and an estimated load of each AP corresponding to the AP operating channel combination is calculated by combining with transmitting power of the APs in the AP transmitting power combination and the corresponding operating channels (that is, the selected operating channels). After the estimated load of each AP corresponding to the AP operating channel combination is obtained, then a key performance indicator (KPI) of the WLAN corresponding to the AP operating channel combination may be calculated according to the estimated load. Specifically, the estimated load of each AP and the KPI of the WLAN corresponding to each AP operating channel combination in the set of AP operating channel combinations corresponding to the AP transmitting power combination may be calculated according to the above approach, and an AP operating channel combination (that is, an AP operating channel combination which minimizes a service disruption ratio of the whole network) which is mostly suitable for the AP transmitting power combination is selected from the set of AP operating channel combinations corresponding to the AP transmitting power combination according to the obtained KPI. In a specific implementation, a signal to interference plus noise ratio or a signal to noise ratio of a sub area i may be calculated according to transmitting power of APs in the AP transmitting power combination x (the AP transmitting power combination x is any AP transmitting power combination in the set of AP transmitting power combinations pre-selected above), operating channels of APs in an AP operating channel combination corresponding to the AP transmitting power combination x and noise power of the sub area i (where, the sub area i is any one of sub areas divided from the coverage area of the APO of a coverage area of the $AP_c$(a specific AP corresponding to the above AP transmitting power combination) and by combining with a channel gain from the sub area i to the $AP_c$ or channel gains from the sub area i to adjacent APs (e.g., $AP_d$s) of the coverage area of the $AP_c$, specifically, a method for calculating the signal to interference plus noise ratio or the signal to noise ratio $SINR_i$ of the sub area i is as follow:

$$SINR_i = \frac{P_c h_{i,c}}{P^{noise} + \sum_{d \in ANR_c}(1-\alpha_{i,d})x_{c,d}P_d h_{i,d}}$$

$P_c$ in the above equation is the transmitting power of the AP (that is, $AP_C$) to which the sub area i belongs in the selected AP transmitting power combination; $P_d$ is the transmitting power of the adjacent AP (such as the $AP_d$) of the AP, in the selected AP transmitting power combination; $P^{noise}$ is the noise power of the sub area i, and $ANR_c$ is a set of adjacent areas of the coverage area of the $AP_c$.

Furthermore, the channel gain from the sub area i to the $AP_c$ is a ratio of average power of signals of the $AP_c$ received by the user of the sub area i to current transmitting power of the $AP_c$, that is, $$h_{i,c} = \frac{P_{i,c}}{P_c}$$

$P_{i,c}$ in the above equation is then average receiving power of signals received by the user of the sub area i from the $AP_c$, which may be obtained by averaging receiving power reported by the user of the sub area i, and $P_c$ in the above equation is then current transmitting power of the $AP_c$.

Specifically, the channel gain $h_{i,d}$ from the sub area i to the adjacent AP (such as $AP_d$) of the $AP_c$ is a ratio of average power of the $AP_d$ received by the user of the sub area i to current transmitting power of the $AP_d$, that is, $$h_{i,d} = \frac{P_{i,d}}{P_d}$$

$P_{i,d}$ in the above equation is then average receiving power of signals received by the user of the sub area i from the $AP_d$, which may be obtained by averaging receiving power reported by the user of the sub area i, and $P_d$ in the above equation is then current transmitting power of the $AP_d$.

In a specific implementation, a method for determining values of $x_{c,d}$ and $\alpha_{i,c}$ in the formulae for calculating the signal to interference plus noise ratio or the signal to noise ratio of the sub area i is as follow:

$$x_{c,d} = \begin{cases} 0, \text{ operating channels of the } AP_c \text{ and the } AP_d \text{ are different} \\ 1, \text{ otherwise} \end{cases};$$

$$\alpha_{i,d} = \begin{cases} 0, P_{i,d} < CCA_i \\ 1, \text{ otherwise} \end{cases}$$

That is, when operating channels of the $AP_c$ and the $AP_d$ are different (i.e. the operating channels of the $AP_c$ and the $AP_d$ are not consistent in the selected AP operating channel combination), $x_{c,d}$ is 0, otherwise, $x_{c,d}$ is 1; when the $P_{i,d}$ is less than the $CCA_i$, $\alpha_{i,d}$ is 0, otherwise, $\alpha_{i,d}$ is 1. Where, $\alpha_{i,d}=0$ represents load increases caused by an interference domain, $\alpha_{i,d}=1$ represents load increases caused by a transmission domain (competition), and $CCA_i$ is an average channel detection threshold of the sub area i.

It can be know from definitions of the variables in the method for calculating the signal to interference plus noise ratio or the signal to noise ratio $SINR_i$ of the sub area i, when the average receiving power from the $AP_d$ (that is, $P_{i,d}$) of the sub area i is less than the average channel detection threshold (that is, $CCA_i$ of the sub area i, then the signal to interference plus noise ratio of the sub area i may be calculated by combining with the channel gain from the sub area i to the $AP_c$ and the channel gain from the sub area i to the $AP_d$, that is, there are load increases caused by the interference domain in the sub area i at this time; when the average receiving power from the $AP_d$ (that is, $P_{i,d}$) of the sub area i is greater than or equal to the average channel detection threshold (that is, $CCA_i$) of the sub area i, then the signal to noise ratio of the sub area i may be calculated by combining with the channel gain from the sub area i to the $AP^c$ (that is, there is no need to take the channel gain from the sub area i to the $AP_d$ into consideration at this time), that is, there are load increases caused by the transmission domain in the sub area i at this time, and the load increase caused by the interference domain does not exist.

In some practicable implementations, after the signal to interference plus noise ratio or the signal to noise ratio $SINR_i$ of the sub area i is obtained, and joint with the channel bandwidth and the user service requirement (that is, the average service requirement of the sub area i obtained through statistics) of the sub area i, a required transmission duration corresponding to the user service requirement of the sub area i may be calculated. Specifically, an obtainable rate $R_i$ of the sub area i may be calculated according to the signal to interference plus noise ratio or the signal to noise ratio of the sub area i of the $AP_c$ and by combining with the channel bandwidth of the sub area i, that is, the obtainable rate of the sub area i of the $AP_c$ is:

$$R_i = k_c^{sch} \eta^{BW} W \log_2(1 + \eta^{SINR} SINR_i)$$

$k_c^{sch}$, $\eta^{BW}$ and $\eta^{SINR}$ in the above equation are a scheduler coefficient, a channel bandwidth coefficient, a signal to interference plus noise ratio or a signal to noise ratio coefficient of the $AP_c$ respectively, and W is the channel bandwidth.

After the obtainable rate of the sub area i is obtained, and joint with the user service requirement of the sub area i, then the required transmission duration corresponding to the user service requirement of the sub area i may be calculated, thus, it can be seen that the required transmission duration corresponding to the sub area i of which the user service requirement is $D_i$ is:

$$T_i = \frac{D_i}{R_i} + \sum_{d \in ANR_c} \alpha_{i,d} x_{c,d} T'_d$$

where, $T'_d = \sum_{j \in AP_d} \frac{D_j}{R_j}$ is the user transmission duration of the adjacent area of the coverage area of the $AP_c$.

In some practicable implementations, after the transmission duration correspondingly required for obtaining the average service requirement of the sub area i is obtained, and joint with signal interference or competition interference of the sub area i, a total transmission duration required by all users of the $AP_c$ may be calculated. That is, for the $AP_c$, the total transmission duration required by all the users may be represented by:

$$T_c = \sum_{i \in AP_c} \frac{D_i}{R_i} + \sum_{d \in ANR_c} \min\left(\sum_{i \in AP_c} \alpha_{i,d}, 1\right) x_{c,d} \cdot T'_d$$

A first item in the above equation includes the obtainable rate of the sub area i, a factor such as the transmitting power of the adjacent area of the coverage area of the $AP_c$ is taken into consideration, thus it can be seen that signal interference of the adjacent area of the coverage area of the $AP_c$ is taken into consideration; furthermore, a second item in the above equation takes competition interference of the adjacent area of the coverage area of the $AP_c$ into consideration. Thus, it can be seen from the above equation that, when the average receiving power from the adjacent APs of the sub area i is less than an average channel detection threshold of the sub area i, the total transmission duration required by all users of the $AP_c$ is a sum of required transmission durations corresponding to the average service requirement of all sub areas of the coverage area of the $AP_c$; when the average receiving power from the adjacent APs of the sub area i is greater than or equal to the average channel detection threshold of the sub area i, the total transmission duration required by all users of the $AP_c$ is a sum of required transmission durations corresponding to the average service requirement of all sub areas of the coverage area of the $AP_c$ plus transmission durations of all users of the adjacent APs. That is, carrier characteristics and interference of the WLAN are taken into consideration during the calculation of the estimated load of the $AP_c$, and accuracy of the estimated load may be greatly increased by combining with channel allocation.

In some practicable implementations, after the total transmission duration required by all users of the $AP_c$ is obtained, a total transmission duration available for the $AP_c$ corresponding to a nominal rate of the $AP_c$ may also be calculated according to an average obtainable rate of the $AP_c$ and a protocol efficiency factor of a media access control (MAC) layer of the $AP_c$ and by combining with the nominal rate of the $AP_c$, specifically, the total transmission duration available for the $AP_c$ of which the nominal rate is $C_c$ is:

$$T_{total,c} = \frac{C_c \eta_c}{R_{avg,c}}$$

The average obtainable rate of the $AP_c$ may be:

$$R_{avg,c} = \frac{1}{|AP_c|} \sum_{i \in AP_c} R_i$$

$|AP_c|$ is the total number of users of the $AP_c$. $\eta_c$ is the protocol efficiency factor of the MAC layer of the $AP_c$ which may be obtained by the following expression:

$$\eta_c = \frac{P_{tr} P_s T_s}{(1 - P_{tr})\sigma + P_{tr} P_s T_s + P_{tr}(1 - P_s)T_c}$$

Meanings and values of items in the above expression are shown in Table 1:

TABLE 1

| | |
|---|---|
| $T_s$ | Average time duration required for successfully transmitting a packet, a statistic is taken |
| $T_c$ | Average time duration of a packet collision, a statistic is taken |
| $\sigma$ | A slot length of the MAC layer, being a system constant |
| q | Packet arrival probability, depending on a service model |
| $\tau$ | A probability for any station to transmit data within a random slot |
| p | Packet collision probability |
| $P_s = \frac{n\tau(1-\tau)^{n-1}}{1-(1-\tau)^n}$ | Successful transmission probability |
| $P_{tr} = 1 - (1-\tau)^n$ | A probability of having packet transmission |

The packet collision probability p and the data transmission probability $\tau$ in Table 1 described above may be obtained by the following equations:

$$\begin{cases} p = 1 - (1-\tau)^{n-1} \\ \tau = b_{(0,0)} \frac{q^2}{1-q} \left( \frac{W_0}{(1-p)(1-(1-q))^{W_0}} - (1-p) \right) \end{cases}$$

Specifically, in the above equations, $W_o$ is an initial contention window, and has the following relationship with the $b_{(0,0)}$ in the above equation:

$$1/b_{(0,0)e} = (1-q) + \frac{q^2 W_0(W_0+1)}{2(1-(1-q)^{W_0})} +$$
$$\frac{q(W_0+1)}{2(1-q)}\left(\frac{q^2 W_0}{1-(1-q)^{W_0}} + p(1-q) - q(1-p)^2\right) +$$
$$\frac{pq^2}{2(1-q)(1-p)}\left(\frac{W_0}{1-(1-q)^{W_0}} - (1-p)^2\right)\left(2W_0 \frac{1-p-p(2p)^{m-1}}{1-2p} + 1\right)$$

m is the maximum retransmission times, and n is the number of terminals associated with the $AP_c$.

In some practicable implementations, after the total transmission duration $T_c$ required by all users of the $AP_c$ and the total transmission duration $T_{total,c}$ available for the $AP_c$ corresponding to the nominal rate of the $AP_c$ are obtained, then an estimated load of the $AP_c$ may be calculated, and a formula for calculating the estimated load of the $AP_c$ is as follow:

$$\hat{\rho}_c = \frac{T_c}{T_{total,c}}$$

In a specific implementation, after the estimated load of the $AP_c$ is obtained, then a KPI of the WLAN corresponding to the AP transmitting power combination x under the AP operating channel combination may be calculated according to the estimated load of the $AP_c$. Likewise, estimated loads of the $AP_c$ and corresponding KPIs of the WLAN under other AP operating channel combinations may be calculated according to the above approach. Furthermore, an estimated load of each AP corresponding to each AP transmitting power combination may also be calculated according to the method for calculating the estimated load of the $AP_c$ corresponding to the AP transmitting power combination x, that is, the estimated load of each AP and the corresponding KPIs of the WLAN may be calculated for each AP transmitting power combination under all the corresponding AP operating channel combinations.

In some practicable implementations, there may be a plurality of KPIs of the WLAN, which may be user dissatisfaction, a service disruption ratio of an AP and distribution of signal to interference plus noise ratios or signal to noise ratios of an AP, that is, the KPIs of the WLAN may include: user dissatisfaction of the whole network of the WLAN, a service disruption ratio of the whole network of the WLAN, an average load of the whole network of the WLAN and distribution of signal to interference plus noise ratios or signal to noise ratios of the whole network of the WLAN. In a specific implementation, the KPIs of the WLAN corresponding to each AP operating channel combination in the set of AP operating channel combinations corresponding to each AP transmitting power combination may also be calculated according to the estimated load of each AP as obtained and quantity of users of each AP, that is, the KPI of the whole network.

In some practicable implementations, calculations of related network performance indicators may be performed according to the estimated load of the current statistical cycle, such as the user dissatisfaction of the whole network, the service disruption ratio, etc. Specifically, based on the estimated load of each AP, the user dissatisfaction of the whole network may be obtained as follow:

$$f_{UDR}(B, M) = \frac{\sum_{c \in AP} \max(M_c \cdot (1 - 1/\hat{\rho}_c), 0)}{\sum_{c \in AP} M_c}$$

The AP in the above equation is a set of APs of the whole network, $M_c$ is the number of users of the $AP_c$, B refers to different channel configuration schemes, that is, channel configuration schemes of the WLAN corresponding to different AP transmitting power combinations, and M refers to the number of users of the AP. In a specific implementation, different estimated loads of each AP may be obtained according to AP transmitting power in different AP transmitting power combinations, thereby obtaining different user dissatisfactions, and optimization of the user dissatisfactions may improve user experience of the coverage area of the AP and edge areas thereof.

Furthermore, based on the estimated load of each AP, the service disruption ratio of the whole network may also be obtained as follow:

$$f_{SI}(B, B^{pre}, M) = \frac{\sum_{c \in AP} (b_c \neq b_c^{pre}) M_c \cdot \min(\hat{\rho}_c, 1)}{\sum_{c \in AP} M_c}$$

$B_c$ and $B^{pre}$ in the above equation are a newly allocated channel and a previous channel of the $AP_c$ respectively. In a specific implementation, different estimated loads of each AP may be obtained according to AP transmitting power in different AP transmitting power combinations, thereby obtaining different service disruption ratios of the whole network. Optimization of the service disruption ratios may reduce cost for spectrum configuration, and further improve user experience.

Moreover, based on the estimated load of each AP, the average load of the whole network may also be obtained as follow:

$$f_{m\text{-}load}(B, M) = \frac{\sum_{c \in AP} \hat{\rho}_c}{|AP|}$$

|AP| as described above is the total number of APs in the whole network. Different estimated loads of each AP may be obtained according to AP transmitting power in different AP transmitting power combinations, thereby obtaining different average loads of the whole network, specifically, optimization of the average loads of the whole network may increase network capacity, and improve user experience of the network.

Furthermore, based on the distribution of the signal to noise ratios $SINR_c$ of each AP corresponding to each AP transmitting power combination as obtained, distribution of signal to interference plus noise ratios or signal to noise ratios SINR of the whole network may be obtained as follow:

$$f_{SINR}(P, B) = \frac{\sum_{c \in AP} SINR_c}{|AP_c|}$$

$SINR_c$ in the above equation is distribution of signal to noise ratios of the $AP_c$, B refers to different channel configuration schemes, and P refers to different power configuration schemes.

S104, selecting, according to the calculated KPIs of the WLAN, an optimal channel configuration scheme of the WLAN corresponding to each AP transmitting power combination, and selecting an optimal power and channel configuration scheme of the WLAN from the optimal channel configuration schemes of the WLAN corresponding to all AP transmitting power combinations.

In some practicable implementations, after the KPIs of the WLAN corresponding to each AP transmitting power combination is obtained, i.e. the user dissatisfaction of the whole network, the service disruption ratio of the whole network, the average load of the whole network and the distribution of the signal to interference plus noise ratios or the signal to noise ratios SINR of the whole network, then an optimal channel configuration scheme of the WLAN corresponding to each AP transmitting power combination may be selected according to the KPIs of the WLAN described above. In a specific implementation, embodiments of the present disclosure mainly use a particle swarm optimization algorithm to select the optimal channel configuration scheme of the WLAN corresponding to each AP operating channel corresponding to each AP transmitting power combination, where a calculating process of the above particle swarm optimization algorithm may include steps of:

(1) initializing, by a particle swarm, an initial-generation individual, that is, a power and channel (or spectrum) distribution scheme required in this embodiment;

(2) assessing particles, that is, calculating KPI values corresponding to all current particles;

(3) grading the particles based on the assessment thereof, and calculating an intensity of each grade;

(4) calculating a current optimal position of the individual and a current optimal position of the swarm;

(5) updating particle velocities and positions;

(6) using a mutation and a crossover to produce a portion of new particle positions and adding them into the particle swarm, where the mutation selects several current-generation individuals for stochastic disturbance to generate a quality mutated individual, a joint individual and the mutated individual form a next-generation to enter a next cycle, where the joint individual is generated by the crossover through selecting and crossing several current-generation individuals.

In some practicable implementations, the user dissatisfaction of the whole network and the average load of the whole network and etc. of the WLAN corresponding to each AP operating channel combination in the set of AP operating channel combinations corresponding to each AP transmitting power combination may be treated as optimization objectives of the particle swarm optimization algorithm firstly (that is, may be treated as the assessed particles of the particle swarm optimization algorithm for assessment and calculation), and a set of channel configuration schemes with the optimal optimization objectives corresponding to each AP transmitting power combination is acquired through the calculation using the particle swarm optimization algorithm (since an AP operating channel combination may correspond to a configuration scheme corresponding to an AP transmitting power combination, and an AP transmitting power combination may correspond to a set of AP operating channel combinations, i.e., a plurality of AP operating channel combinations, each AP transmitting power combination may correspond to a set of channel configuration schemes with optimal optimization objectives), and then the service disruption ratio of the whole network of the WLAN corresponding to each configuration scheme in the set of channel configuration schemes with the optimal optimization objectives corresponding to each AP transmitting power combination is calculated, and then a configuration scheme of which the service disruption ratio is lowest is selected therefrom, and the configuration scheme is selected as the optimal channel configuration scheme of the WLAN corresponding to the AP transmitting power combination.

In some practicable implementations, after the optimal channel configuration scheme of the WLAN corresponding to each AP transmitting power combination is obtained, then the configuration scheme of which the service disruption ratio is lowest may be selected from the optimal channel configuration schemes corresponding to all AP transmitting power combinations as an optimal power and channel configuration scheme of the whole network of the WLAN. Specifically, an AP transmitting power combination of which the service disruption ratio of the whole network of the WLAN is lowest may be selected from the optimal channel configuration schemes of the WLAN corresponding to all AP transmitting power combinations, and the AP transmitting power combination has been corresponding to an optimal channel configuration scheme of the WLAN, then the AP transmitting power combination and the optimal channel combination corresponding thereto (i.e. a channel combination included in the optimal channel configuration scheme) may be selected as the optimal power and channel configuration scheme of the WLAN. After the optimal power and channel configuration scheme of the WLAN are selected, then the power and channel configuration scheme may be used to complete power and channel configuration of the WLAN network.

In some practicable implementations, when selecting the optimal configuration scheme of the AP transmitting power combination and the channel combination according to the calculated KPIs of the WLAN corresponding to all AP transmitting power combinations, the user dissatisfaction and the average load of the whole network of the WLAN corresponding to each AP transmitting power combination and each corresponding AP operating channel combination may also be firstly treated as optimization objectives, to acquire a set of channel configuration schemes with the optimal optimization objectives of each AP transmitting power combination and each corresponding AP operating channel combination; then, an AP transmitting power combination and an corresponding AP operating channel combination of which the service disruption ratio of the whole network of the WLAN is lowest are selected from the set of channel configuration schemes with the optimal optimization objectives. That is, the optimal channel configuration schemes with the optimal optimization objectives may be found in the channel configuration schemes of all AP operating channel combinations corresponding to each AP transmitting power combination through screening firstly, these channel configuration schemes with the strongest optimization objectives form a set, and then an AP transmitting power combination and an corresponding AP operating channel combination which enable the service disruption ratio of the whole network of the WLAN to be lowest are selected from the set as the optimal power and channel configuration of the WLAN.

By means of acquiring estimated loads of APs through processing information such as a coverage area, transmitting power and channel information of the APs in a WLAN and a service requirement of the coverage area of the APs, and thus acquiring key performance indicators of the network such as user dissatisfaction, an average load, a service disruption ratio and distribution of signal to interference plus noise ratios or signal to noise ratios, and then selecting an optimal power and channel configuration scheme of the WLAN according to the key performance indicators of the WLAN, this embodiment can rapidly find the optimal power and channel configuration scheme of the WLAN, thereby improving power and channel adjusting efficiency of the WLAN, improving throughput and resource utilization of the WLAN, and increasing user experience and stickiness of the WLAN network.

Figure 2:
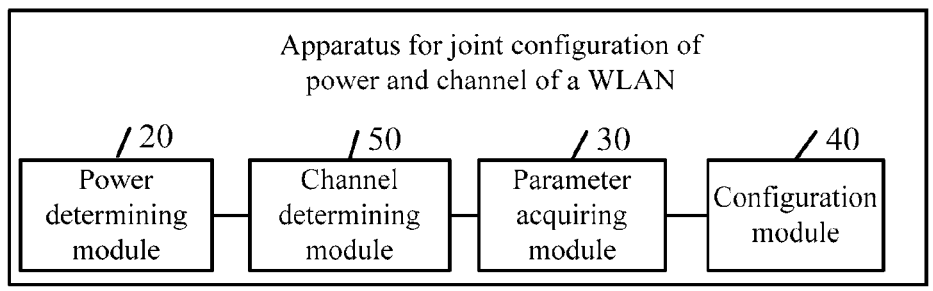
FIG. 2 is a schematic structural diagram of an apparatus for joint configuration of power and channel of a WLAN according to an embodiment of the present disclosure.

Reference may be made to FIG. 2, which a schematic structural diagram of an apparatus for joint configuration of power and channel of a WLAN according to an embodiment of the present disclosure. The apparatus for joint configuration of power and channel of the WLAN as described in this embodiment includes:

A power determining module 20, configured to select transmitting power of each AP from transmitting power ranges of APs of a WLAN to form an AP transmitting power combination.

A channel determining module 50, configured to determine a set of AP operating channel combinations corresponding to each AP transmitting power combination according to operating channels of the APs in the WLAN.

A parameter acquiring module 30, configured to calculate an estimated load of each AP corresponding to each AP operating channel combination in the set of AP operating channel combinations corresponding to each AP transmitting power combination, and calculate KPIs of the WLAN corresponding to each AP operating channel combination according to the estimated load of each AP.

A configuration module 40, configured to select, according to the calculated KPIs of the WLAN, an optimal channel configuration scheme of the WLAN corresponding to each AP transmitting power combination, and select an optimal power and channel configuration scheme of the WLAN from the optimal channel configuration schemes of the WLAN corresponding to all AP transmitting power combinations.

Figure 3:
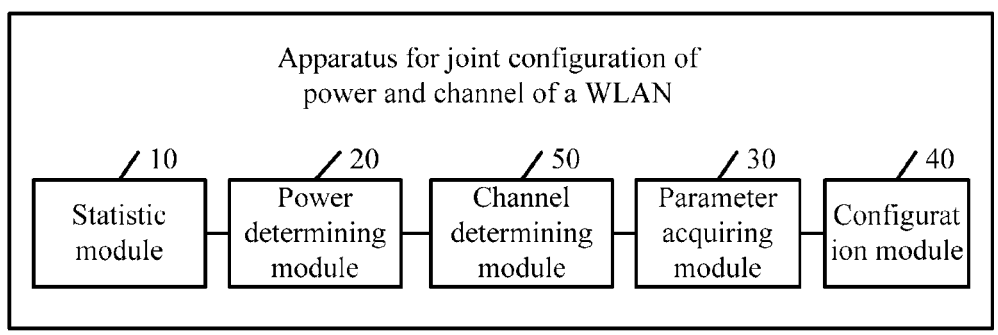
FIG. 3 is another schematic structural diagram of an apparatus for joint configuration of power and channel of a WLAN according to an embodiment of the present disclosure.

In some practicable implementations, the apparatus for joint configuration of power and channel of the WLAN as described in this embodiment (as shown in FIG. 3) also includes:

A statistics module 10, configured to divide a coverage area of each of the APs of the WLAN into a plurality of sub areas, and set a statistical cycle for services or power of the sub areas; and regularly receive, according to the statistical cycle, average service requirements, useful power, interference power and average channel detection thresholds of the sub areas of the coverage areas of the APs of the WLAN as obtained by the APs through statistics.

Figure 4:
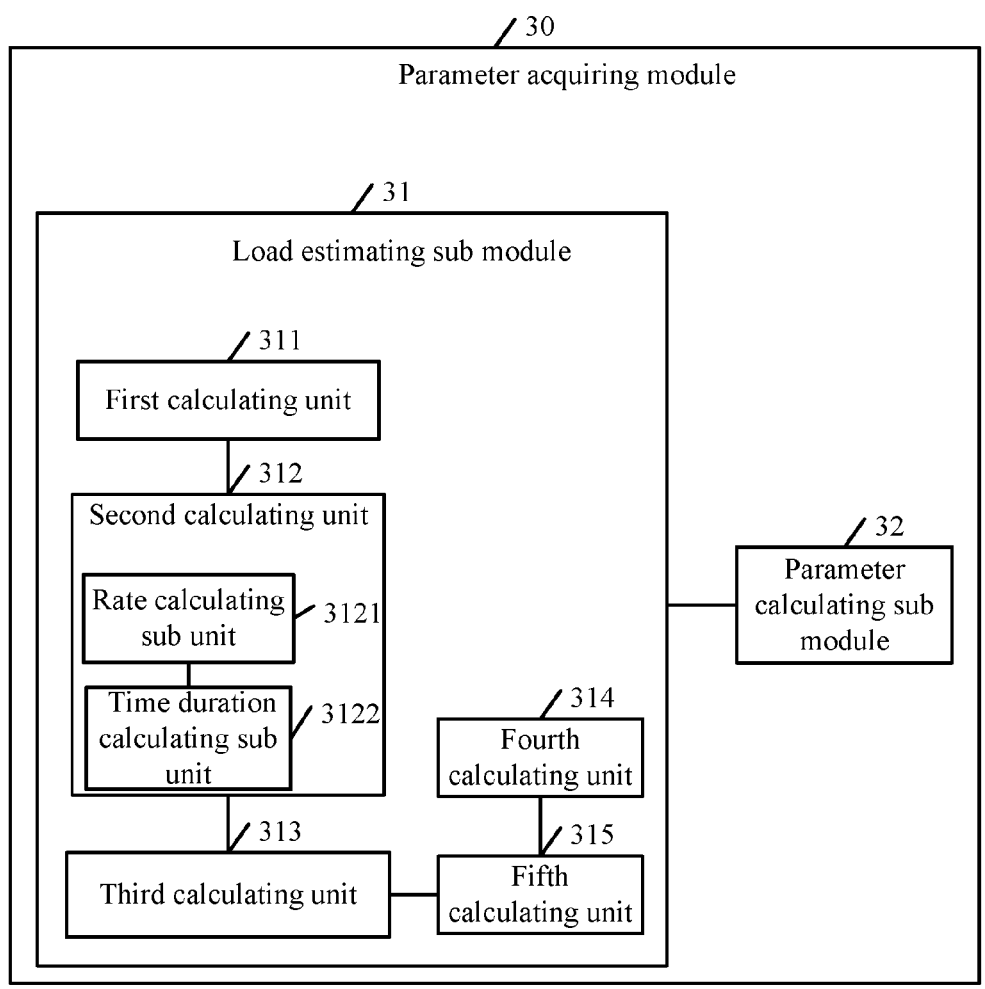
FIG. 4 is a schematic structural diagram of a parameter acquiring module of an apparatus for joint configuration of power and channel of a WLAN according to an embodiment of the present disclosure.

In some practicable implementations, the parameter acquiring module 30 (as shown in FIG. 4) includes:

A load estimating sub module 31, configured to calculate the estimated load of each AP corresponding to each AP operating channel combination in the set of AP operating channel combinations corresponding to each AP transmitting power combination.

A parameter calculating sub module 32, configured to calculate the KPIs of the WLAN corresponding to each AP operating channel combination according to the estimated load of each AP.

The load estimating sub module 31 includes:

A first calculating unit 311, configured to calculate a signal to interference plus noise ratio or a signal to noise ratio of a sub area i, according to transmitting power of APs in a specific AP transmitting power combination (the AP transmitting power combination x), noise power of the sub area i of a coverage area of a specific AP ($AP_c$) corresponding to the AP transmitting power combination x and operating channels of APs in an AP operating channel combination corresponding to the AP transmitting power combination x and by combining with a channel gain from the sub area i to the $AP_c$ or channel gains from the sub area i to adjacent APs ($AP_ds$).

A second calculating unit 312, configured to calculate a required transmission duration corresponding to an average service requirement of the sub area i, according to the signal to interference plus noise ratio or the signal to noise ratio of the sub area i and by combining with a channel bandwidth and the average service requirement of the sub area i.

A third calculating unit 313, configured to calculate a total transmission duration required by all users of the $AP_c$, according to the required transmission duration corresponding to the average service requirement of the sub area i and by combining with signal interference or competition interference of the sub area i.

A fourth calculating unit 314, configured to calculate a total transmission duration available for the $AP_c$ corresponding to a nominal rate of the $AP_c$, according to an average obtainable rate of the $AP_c$ and a protocol efficiency factor of a media access control MAC layer of the $AP_c$ and by combining with the nominal rate of the $AP_c$.

A fifth calculating unit 315, configured to calculate an estimated load of the AP, according to the total transmission duration required by all users of the $AP_c$ and the total transmission duration available for the $AP_c$ corresponding to the nominal rate of the $AP_c$.

The second calculating unit 312 described above includes:

A rate calculating sub unit 3121, configured to calculate the obtainable rate of the sub area i according to the signal to interference plus noise ratio or the signal to noise ratio of the sub area i and by combining with the channel bandwidth of the sub area i.

A time duration calculating sub unit 3122, configured to calculate the required transmission duration corresponding to the average service requirement of the sub area i, according to the average service requirement of the sub area i and by combining with the obtainable rate of the sub area i.

Figure 5:
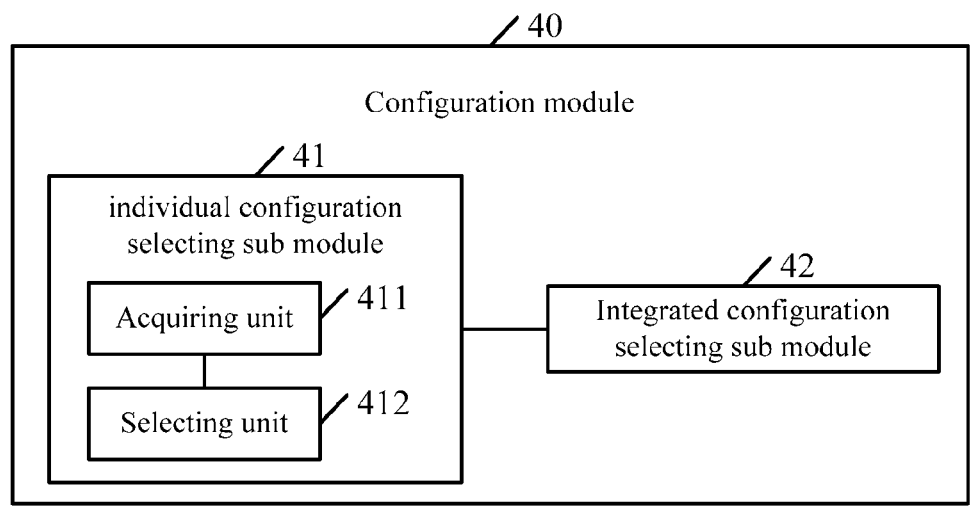
FIG. 5 is a schematic structural diagram of a configuration module of an apparatus for joint configuration of power and channel of a WLAN according to an embodiment of the present disclosure.

In some practicable implementations, the configuration module 40 (as shown in FIG. 5) includes:

An individual configuration selecting sub module 41, configured to select an optimal channel configuration scheme of the WLAN corresponding to each AP transmitting power combination according to the calculated KPIs of the WLAN;

An integrated configuration selecting sub module 42, configured to select, from the optimal power and channel configuration schemes of the WLAN corresponding to all AP transmitting power combinations, an optimal power and channel configuration scheme of the WLAN.

The individual configuration selecting sub module 41 includes:

An acquiring unit 411, configured to treat the user dissatisfaction and the average load of the whole network of the WLAN corresponding to each AP operating channel combination in the set of AP operating channel combinations corresponding to each AP transmitting power combination as optimization objectives, and acquire a set of channel configuration schemes with optimal optimization objectives corresponding to each AP transmitting power combination.

A selecting unit 412, configured to calculate the service disruption ratio of the whole network of the WLAN corresponding to each configuration scheme in the set of channel configuration schemes with the optimal optimization objectives corresponding to each AP transmitting power combination, and select, from the set of channel configuration schemes with the optimal optimization objectives corresponding to each AP transmitting power combination, a configuration scheme of which the service disruption ratio is lowest as the optimal channel configuration scheme of the WLAN corresponding to each AP transmitting power combination.

In some practicable implementations, the WLAN network described in embodiments of the present disclosure may include a plurality of APs, and each AP has its own coverage area, there are a plurality of the AP transmitting power combinations, and each AP transmitting power combination includes the transmitting power of each AP in the WLAN described above. In a specific implementation, the power determining module 20 may select transmitting power of each AP according to transmitting power ranges of APs in the WLAN, that is, a specific transmitting power value of a specific AP may be selected from a transmitting power value range of the AP, and the selected transmitting power of each AP is joint to form an AP transmitting power combination. In a specific implementation, the power determining module 20 may select a plurality of transmitting power for each AP, and selected transmitting power of APs is joint into a set of transmitting power combinations, where the set of transmitting power combinations above may include a plurality of AP transmitting power combinations.

After the power determining module 20 selects an AP transmitting power combination, then the channel determining module 50 may determine a set of AP operating channel combinations corresponding to the AP transmitting power combination according to information about operating channels of the APs in the AP transmitting power combination, where the set of AP operating channel combinations may include a plurality of AP operating channel combinations, that is, all AP operating channel combinations corresponding to the AP transmitting power combination may be determined. After the AP transmitting power combination and the set of corresponding AP operating channel combinations are determined, then an estimated load of each AP corresponding to each AP operating channel combination may be calculated according to the transmitting power combination.

In some practicable implementations, the statistics module 10 may divide a coverage area of each of the APs in the WLAN into a plurality of sub areas firstly, and set a statistical cycle for services or power of each sub area. After the statistics module 10 sets a statistical cycle for services or power of sub areas, then an average service requirement, useful power, interference power and an average channel detection threshold of each sub area as obtained by each AP through regularly statistics according to the statistical cycle may be received. Specifically, useful power of a specific sub area in the sub areas is mainly average receiving power received by a user of the sub area from its serving AP, for instance, useful power of a sub area i (the sub area i is one of sub areas divided from a coverage area of an $AP_c$, where the $AP_c$ is any one of a plurality of APs of the WLAN) is mainly average receiving power received by a user of the sub area i from the $AP_c$. Interference power of a specific sub area in the sub areas is average receiving power received by a user of the sub area from an adjacent AP, for instance, interference power of the sub area i is mainly average receiving power received by a user of the sub area i from adjacent APs.

In a specific implementation, after the statistics module 10 obtains, through statistics, the average service requirement, the useful power and the interference power of the coverage areas of the APs in the WLAN network, and combines with the selected AP transmitting power combination and the corresponding AP operating channel combination as selected by the power determining module 20 and the channel determining module 50, then estimated loads of the APs in the AP transmitting power combination may be calculated.

In some practicable implementations, after the set of AP transmitting power combinations is determined, then an AP transmitting power combination may be selected therefrom, and estimated loads of APs corresponding to the AP transmitting power combination is calculated according to a set of AP operating channel combinations corresponding to the AP transmitting power combination. Specifically, when the parameter acquiring module 30 calculates estimated loads of APs corresponding to a specific AP transmitting power combination, an AP operating channel combination may be selected from a set of AP operating channel combinations corresponding to the AP transmitting power combination firstly, and an estimated load of each AP corresponding to the AP operating channel combination is calculated by combining with transmitting power of the APs in the AP transmitting power combination and the corresponding operating channels (that is, the selected operating channels). After the parameter acquiring module 30 acquires the estimated load of each AP corresponding to the AP operating channel combination, then a KPI of the WLAN corresponding to the AP operating channel combination may be calculated according to the estimated load. Specifically, the estimated load of each AP and the KPIs of the WLAN corresponding to each AP operating channel combination in the set of AP operating channel combinations corresponding to the AP transmitting power combination may be calculated according to the above approach, and an AP operating channel combination (that is, an AP operating channel combination which minimizes a service disruption ratio of the whole network) which is mostly suitable for the AP transmitting power combination is selected from the set of AP operating channel combinations corresponding to the AP transmitting power combination according to the obtained KPI. In a specific implementation, the first calculating unit 311 of the load estimating sub module 31 may calculate a signal to interference plus noise ratio or a signal to noise ratio of a sub area i according to transmitting power of APs in the AP transmitting power combination x (the AP transmitting power combination x is any AP transmitting power combination in the set of AP transmitting power combinations as pre-selected above), operating channels of APs in an AP operating channel combination corresponding to the AP transmitting power combination x and noise power of the sub area i (where, the sub area i is any one of sub areas divided from the coverage area of the $AP_c$) of a coverage area of the $AP_c$ (a specific AP corresponding to the above AP transmitting power combination) and by combining with a channel gain from the sub area i to the $AP_c$ or channel gains from the sub area i to adjacent APs (e.g., $AP_d$) of the coverage area of the $AP_c$. Specifically, a method for calculating the first calculating unit 311 to calculate the signal to interference plus noise ratio or the signal to noise ratio $SINR_i$ of the sub area i is as follow:

$$SINR_i = \frac{P_c h_{i,c}}{P^{noise} + \sum_{d \in ANR_c}(1-\alpha_{i,d})x_{c,d}P_d h_{i,d}}$$

$P_c$ in the above equation is the transmitting power of the AP (that is, $AP_c$) to which the sub area i belongs in the selected AP transmitting power combination; $P_d$ is the transmitting power of the adjacent AP (such as the $AP_d$) of the $AP_c$ in the selected AP transmitting power combination; $P^{noise}$ is the noise power of the sub area i, and $ANR_c$ is a set of adjacent areas of the coverage area of the $AP_c$. Furthermore, the channel gain $h_{i,c}$ from the sub area i to the $AP_c$ is a ratio of average power of signals of the $AP_c$ received by the user of the sub area i to current transmitting power of the $AP_c$, that is, $$h_{i,c} = \frac{P_{i,c}}{P_c}$$

$P_{i,c}$ in the above equation is average receiving power of signals received by the user of the sub area i from the $AP_c$, which may be obtained by averaging receiving power reported by the user of the sub area i, and $P_c$ in the above equation is then current transmitting power of the $AP_c$.

Specifically, the channel gain $h_{i,d}$ from the sub area i to the adjacent AP (such as $AP_d$) of the $AP_c$ is a ratio of average power of the $AP_d$ received by the user of the sub area i to current transmitting power of the $AP_d$, that is, $$h_{i,d} = \frac{P_{i,d}}{P_d}$$

$P_{i,d}$ in the above equation is average receiving power of signals received by the user of the sub area i from the $AP_d$, which may be obtained by averaging receiving power reported by the user of the sub area i, and $P_d$ in the above equation is then current transmitting power of the $AP_d$.

In a specific implementation, a method for determining values of $x_{c,d}$ and $\alpha_{i,d}$ in the formulae for calculating the signal to interference plus noise ratio or the signal to noise ratio of the sub area i is as follow:

$$x_{c,d} = \begin{cases} 0, & \text{operating channels of the } AP_c \text{ and the } AP_d \text{ are different} \\ 1, & \text{otherwise} \end{cases};$$

$$\alpha_{i,d} = \begin{cases} 0, & P_{i,d} < CCA_i \\ 1, & \text{otherwise} \end{cases}$$

That is, when operating channels of the $AP_c$ and the $AP_d$ are different (i.e. the operating channels of the $AP_c$ and the $AP_d$ are not consistent in the selected AP operating channel combination), $x_{c,d}$ is 0, otherwise, $x_{c,d}$ is 1; when the $P_{i,d}$ is less than the $CCA_i$, $\alpha_{i,d}$ is 0, otherwise, $\alpha_{i,d}$ is 1. Where, $\alpha_{i,d}=0$ represents load increases caused by an interference domain, $\alpha_{i,d}=1$ represents load increases caused by a transmission domain (competition), and $CCA_i$ is an average channel detection threshold of the sub area i.

It can be know from definitions of the variables in the method for calculating the signal to interference plus noise ratio or the signal to noise ratio $SINR_i$ of the sub area i, when the average receiving power from the $AP_d$ (that is, $P_{i,d}$) of the sub area i is less than the average channel detection threshold (that is, $CCA_i$) of the sub area i, then the signal to interference plus noise ratio of the sub area i may be calculated by combining with the channel gain from the sub area i to the $AP_c$ and the channel gains from the sub area i to the $AP_d$, that is, there are load increases caused by the interference domain in the sub area i at this time; when the average receiving power from the $AP_d$ (that is, $P_{i,d}$) of the sub area i is greater than or equal to the average channel detection threshold (that is, $CCA_i$) of the sub area i, then the signal to noise ratio of the sub area i may be calculated by combining with the channel gain from the sub area i to the $AP_c$ (that is, there is no need to take the channel gains from the sub area i to the $AP_d$ into consideration at this time), that is, there are load increases caused by the transmission domain in the sub area i at this time, and the load increase caused by the interference domain does not exist.

In some practicable implementations, after the first calculating unit 311 obtains the signal to interference plus noise ratio or the signal to noise ratio $SINR_i$ of the sub area i, then the second calculating unit 312 may calculate a required transmission duration corresponding to a user service requirement of the sub area i according to the data obtained by the first calculating unit 311 and by combining with the channel bandwidth and the user service requirement (that is, the average service requirement of the sub area i obtained by the statistics above) of the sub area i. Specifically, the rate calculating sub unit 3121 of the second calculating unit 312 may calculate an obtainable rate $R_i$ of the sub area i according to the signal to interference plus noise ratio or the signal to noise ratio of the sub area i of the $AP_c$ and by combining with the channel bandwidth of the sub area i, that is, the obtainable rate of the sub area i of the $AP_c$ is:

$$R_i = k_c^{sch} \eta^{BW} W \log_2(1 + \eta^{SINR} SINR_i)$$

$k_c^{sch}$, $\eta^{BW}$ and $\eta^{SINR}$ in the above equation are a scheduler coefficient, a channel bandwidth coefficient, a signal to interference plus noise ratio or a signal to noise ratio coefficient of the AP, respectively, and W is the channel bandwidth.

After the rate calculating sub unit 3121 of the second calculating unit 312 obtains the obtainable rate of the sub area i, then the time duration calculating sub unit 3122 of the second calculating unit 312 may calculate the required transmission duration corresponding to the user service requirement of the sub area i according to the obtainable rate of the sub area i and by combining with the user service requirement of the sub area i, thus, it can be seen that the required transmission duration corresponding to the sub area i of which the user service requirement is $D_i$ is:

$$T_i = \frac{D_i}{R_i} + \sum_{d \in ANR_c} \alpha_{i,d} x_{c,d} T'_d$$

where, $$T'_d = \sum_{j \in AP_d} \frac{D_j}{R_j}$$

is the user transmission duration of the adjacent area of the coverage area of the $AP_c$.

In some practicable implementations, after the second calculating unit 312 obtains the transmission duration correspondingly required by the user service requirement of the sub area i, then the third calculating unit 313 may calculate a total transmission duration required by all users of the $AP_c$ according to the data obtained by the second calculating unit 312 and by combining with signal interference or competition interference of the sub area i. That is, for the $AP_c$, the total transmission duration required by all the users may be represented by:

$$T_c = \sum_{i \in AP_c} \frac{D_i}{R_i} + \sum_{d \in ANR_c} \min\left(\sum_{i \in AP_c} \alpha_{i,d}, 1\right) x_{c,d} \cdot T'_d$$

A first item in the above equation includes the obtainable rate of the sub area i, a factor such as the transmitting power of the adjacent area of the coverage area of the $AP_c$ is taken into consideration, thus it can be seen that signal interference of the adjacent area of the coverage area of the $AP_c$ is taken into consideration; furthermore, a second item in the above equation takes competition interference of the adjacent area of the coverage area of the $AP_c$ into consideration. Thus, it can be seen from the above equation that, when the average receiving power from the adjacent AP of the sub area i is less than an average channel detection threshold of the sub area i, the total transmission duration required by all users of the $AP_c$ is a sum of required transmission durations corresponding to the average service requirement of all sub areas of the coverage area of the $AP_c$; when the average receiving power from the adjacent AP of the sub area i is greater than or equal to the average channel detection threshold of the sub area i, the total transmission duration required by all users of the $AP_c$ is a sum of required transmission durations corresponding to the average service requirement of all sub areas of the coverage area of the $AP_c$ plus transmission durations of all users of the adjacent APs. That is, carrier characteristics and interference of the WLAN are taken into consideration during the calculation of the estimated load of the $AP_c$, and accuracy of the estimated load may be greatly increased by combining with channel allocation.

In some practicable implementations, after the third calculating unit 313 obtains the total transmission duration required by all users of the $AP_c$, then the fourth calculating unit 314 may calculate a total transmission duration available for the $AP_c$ corresponding to a nominal rate of the $AP_c$ according to an average obtainable rate of the $AP_c$ and a protocol efficiency factor of an MAC layer of the $AP_c$ and by combining with the nominal rate of the $AP_c$. Specifically, the total transmission duration available for the $AP_c$ of which the nominal rate is $C_c$ is:

$$T_{total,c} = \frac{C_c \eta_c}{R_{avg,c}}$$

The average obtainable rate of the $AP_c$ may be:

$$R_{avg,c} = \frac{1}{|AP_c|} \sum_{i \in AP_c} R_i$$

$|AP_c|$ is the total number of users of the $AP_c$. $\eta_c$ is the protocol efficiency factor of the MAC layer of the $AP_c$ which may be obtained by the following expression:

$$\eta_c = \frac{P_{tr} P_s T_s}{(1 - P_{tr})\sigma + P_{tr} P_s T_s + P_{tr}(1 - P_s) T_c}$$

Meanings and values of items in the above expression are shown in Table 2:

TABLE 2

| | |
|---|---|
| $T_s$ | Average time duration required for successfully transmitting a packet, a statistic is taken |
| $T_c$ | Average time duration of a packet collision, a statistic is taken |
| $\sigma$ | A slot length of the MAC layer, being a system constant |
| q | Packet arrival probability, depending on a service model |
| $\tau$ | A probability for any station to transmit data within a random slot |
| p | Packet collision probability |
| $P_s = \dfrac{n\tau(1-\tau)^{n-1}}{1-(1-\tau)^n}$ | Successful transmission probability |
| $P_{tr} = 1-(1-\tau)^n$ | A probability of having packet transmission |

The packet collision probability p and the data transmission probability $\tau$ in Table 2 described above may be obtained by the following equations:

$$\begin{cases} p = 1 - (1-\tau)^{n-1} \\ \tau = b_{(0,0)} \dfrac{q^2}{1-q}\left(\dfrac{W_0}{(1-p)(1-(1-q))^{W_0}} - (1-p)\right) \end{cases}$$

Specifically, in the above equations, $W_o$ is an initial contention window, and has the following relationship with the $b_{(0,0)}$ in the above equation:

$$1/b_{(0,0)e} = (1-q) + \dfrac{q^2 W_0(W_0+1)}{2(1-(1-q)^{W_0})} +$$

$$\dfrac{q(W_0+1)}{2(1-q)}\left(\dfrac{q^2 W_0}{1-(1-q)^{W_0}} + p(1-q) - q(1-p)^2\right) +$$

$$\dfrac{pq^2}{2(1-q)(1-p)}\left(\dfrac{W_0}{1-(1-q)^{W_0}} - (1-p)^2\right)\left(2W_0\dfrac{1-p-p(2p)^{m-1}}{1-2p} + 1\right)$$

m is the maximum retransmission times, and n is the number of terminals associated with the $AP_c$.

In some practicable implementations, after the total transmission duration $T_c$ required by all users of the $AP_c$ and the total transmission duration $T_{total,c}$ available for the $AP_c$ corresponding to the nominal rate of the $AP_c$ are obtained, then an estimated load of the $AP_c$ may be calculated through the fifth calculating unit 315. A calculation formula for the fifth calculating unit 315 to calculate the estimated load of the $AP_c$ is as follow:

$$\hat{\rho}_c = \dfrac{T_c}{T_{total,c}}$$

In a specific implementation, after the load estimating sub module 31 obtains the estimated load of each AP (e.g., the $AP_C$), then the parameter calculating sub module 32 may calculate KPIs of the WLAN corresponding to the AP transmitting power combination (e.g., the AP transmitting power combination x) under the AP operating channel combination according to the estimated load of the $AP_c$. Likewise, the parameter calculating sub module 32 may calculate estimated loads of the $AP_c$ and corresponding KPIs of the WLAN under other AP operating channel combinations according to the above approach. Furthermore, an estimated load of each AP corresponding to each AP transmitting power combination may also be calculated according to the method for calculating the estimated load of the $AP_c$ corresponding to the AP transmitting power combination x, that is, the estimated load of each AP and the corresponding KPIs of the WLAN may be calculated for each AP transmitting power combination under all the corresponding AP operating channel combinations.

In some practicable implementations, there may be a plurality of KPIs of the WLAN, which may be user dissatisfaction, a service disruption ratio of an AP and distribution of signal to interference plus noise ratios or signal to noise ratios of an AP, that is, the KPIs of the WLAN may include: user dissatisfaction of the whole network of the WLAN, a service disruption ratio of the whole network of the WLAN, an average load of the whole network of the WLAN and distribution of signal to interference plus noise ratios or signal to noise ratios of the whole network of the WLAN. In a specific implementation, after the load estimating sub module 31 obtains the estimated load of each AP, then the parameter calculating sub module 32 may calculate the KPIs of the WLAN corresponding to each AP operating channel combination in the set of AP operating channel combinations corresponding to each AP transmitting power combination according to the estimated load of each AP as obtained by the load estimating sub module 31 and quantity of users of each AP, that is, the KPI of the whole network.

In some practicable implementations, calculations of related network performance indicators may be performed according to the estimated load of the current statistical cycle, such as the user dissatisfaction of the whole network, the service disruption ratio, etc. During a specific implementation, when the KPI of the WLAN is the user dissatisfaction of the WLAN, when calculating the KPI of the WLAN corresponding to each AP transmitting power combination according to the estimated load of each AP, the parameter calculating sub module 32 is configured to: calculate the user dissatisfaction of the WLAN corresponding to each AP transmitting power combination according to the estimated load of each AP corresponding to each AP transmitting power combination, quantity of users and quantity of APs in the whole network of the WLAN.

Specifically, based on the estimated load of each AP, the user dissatisfaction of the whole network may be obtained as follow:

$$f_{UDR}(B, M) = \dfrac{\sum\limits_{c \in AP} \max(M_c \cdot (1 - 1/\hat{\rho}_c), 0)}{\sum\limits_{c \in AP} M_c}$$

The AP in the above equation is a set of APs of the whole network, $M_c$ is the number of users of the $AP_c$, B refers to different channel configuration schemes, that is, channel configuration schemes of the WLAN corresponding to different AP transmitting power combinations, and M refers to the number of users of the AP. In a specific implementation, different estimated loads of each AP may be obtained according to AP transmitting power in different AP transmitting power combinations, thereby obtaining different user dissatisfactions, and optimization of the user dissatisfactions may improve user experience of the coverage area of the AP and edge areas thereof.

Furthermore, in a specific implementation, when the KPI of the WLAN is the service disruption ratio of the WLAN, when calculating the KPI of the WLAN corresponding to each AP transmitting power combination according to the estimated load of each AP, the parameter calculating sub module 32 is configured to: calculate the service disruption ratio of the WLAN corresponding to each AP transmitting power combination according to the estimated load of each AP corresponding to each AP transmitting power combination, quantity of users, status of a previous channel and a new channel of each AP and quantity of APs in the whole network of the WLAN.

Specifically, based on the estimated load of each AP, the service disruption ratio of the whole network may also be obtained as follow:

$$f_{SI}(B, B^{pre}, M) = \frac{\sum_{c \in AP}(b_c \neq b_c^{pre})M_c \cdot \min(\hat{\rho}_c, 1)}{\sum_{c \in AP} M_c}$$

$B_c$ and $B^{pre}$ in the above equation are a newly allocated channel and a previous channel of the $AP_c$ respectively. In a specific implementation, a terminal may obtain different estimated loads of each AP according to AP transmitting power in different AP transmitting power combinations, thereby obtaining different service disruption ratios of the whole network. Optimization of the service disruption ratios may reduce cost for spectrum configuration, and further improve user experience.

Moreover, in a specific implementation, when the KPI of the WLAN is the distribution of the signal to interference plus noise ratios or the signal to noise ratios of the WLAN, when calculating the key performance indicator KPI of the WLAN corresponding to each AP transmitting power combination according to the estimated load of each AP, the parameter calculating sub module 32 is configured to:

accumulate distribution of signal to interference plus noise ratios or signal to noise ratios of each AP corresponding to each AP transmitting power combination, and combine with a total number of APs of the whole network of the WLAN, calculate the distribution of the signal to interference plus noise ratios or the signal to noise ratios of the whole network of the WLAN corresponding to each AP transmitting power combination.

Specifically, based on the estimated load of each AP, the average load of the whole network may also be obtained as follow:

$$f_{m-load}(B, M) = \frac{\sum_{c \in AP} \hat{\rho}_c}{|AP|}$$

|AP| as described above is the total number of APs in the whole network. A terminal may obtain different estimated loads of each AP according to AP transmitting power in different AP transmitting power combinations, thereby obtaining different average loads of the whole network, optimization of the average loads of the whole network may increase network capacity, and improve user experience of the network.

Furthermore, based on the distribution of the signal to interference plus noise ratios or the signal to noise ratios $SINR_c$ of each AP corresponding to each AP transmitting power combination as obtained by the load estimating sub module 31, the parameter calculating sub module 32 may also obtain distribution of signal to interference plus noise ratios or signal to noise ratios SINR of the whole network as follow:

$$f_{SINR}(P, B) = \frac{\sum_{c \in AP} SINR_c}{|AP_c|}$$

$SINR_c$ in the above equation is distribution of signal to interference plus noises ratios or signal to noise ratios of the AP, B refers to different channel configuration schemes, and P refers to different power configuration schemes.

In some practicable implementations, after the parameter acquiring module 30 acquires the KPIs of the WLAN corresponding to each AP transmitting power combination, i.e. the user dissatisfaction of the whole network, the service disruption ratios of the whole network, the average load of the whole network and the distribution of the signal to interference plus noise ratios or the signal to noise ratios SINR of the whole network, then the configuration module 40 may select an optimal channel configuration scheme of the WLAN corresponding to each AP transmitting power combination according to the KPIs of the WLAN described above. In a specific implementation, the individual configuration selecting sub module 41 of the configuration module 40 mainly uses a particle swarm optimization algorithm to select the optimal channel configuration scheme of the WLAN corresponding to each AP operating channel corresponding to each AP transmitting power combination, where a calculating process of the above particle swarm optimization algorithm may include steps of:

(1) initializing, by a particle swarm, an initial-generation individual, that is, a power and channel (or spectrum) distribution scheme required in this embodiment;

(2) assessing particles, that is, calculating KPI values corresponding to all current particles;

(3) grading the particles based on the assessment thereof, and calculating an intensity of each grade;

(4) calculating a current optimal position of the individual and a current optimal position of the swarm;

(5) updating particle velocities and positions;

(6) using a mutation and a crossover to produce a portion of new particle positions so as to add them into the particle swarm, where the mutation selects several current-generation individuals for stochastic disturbance to generate a quality mutated individual, a joint individual and the mutated individual form a next-generation to enter a next cycle, where the joint individual is generated by the crossover through selecting and combining several current-generation individuals.

In some practicable implementations, the individual configuration selecting sub module 41 may treat the user dissatisfaction of the whole network and the average load of the whole network and etc. of the WLAN corresponding to each AP operating channel combination in the set of AP operating channel combinations corresponding to each AP transmitting power combination as optimization objectives of the particle swarm optimization algorithm firstly (that is, as the assessed particles of the particle swarm optimization algorithm for assessment and calculation), and a set of channel configuration schemes with optimal optimization objectives corresponding to each AP transmitting power combination is acquired through the calculation using the particle swarm optimization algorithm (since an AP operating channel combination may correspond to a configuration scheme corresponding to an AP transmitting power combination, and an AP transmitting power combination may correspond to a set of AP operating channel combinations, i.e., a plurality of AP operating channel combinations, each AP transmitting power combination may correspond to a set of channel configuration schemes with optimal optimization objectives). After the individual configuration selecting sub module 41 acquires a set of optimal power and channel configuration schemes corresponding to each AP transmitting power combination, then the integrated configuration selecting sub module 42 may calculate the service disruption ratio of the whole network of the WLAN corresponding to each configuration scheme as acquired by the individual configuration selecting sub module 41, and select therefrom a configuration scheme of which the service disruption ratio is lowest, and the configuration scheme is then selected as the optimal channel configuration scheme of the WLAN corresponding to the AP transmitting power combination.

In some practicable implementations, after acquiring the optimal channel configuration scheme of the WLAN corresponding to each AP transmitting power combination, then the configuration module 40 may select the optimal configuration scheme of which the service disruption ratio is lowest from the optimal channel configuration schemes corresponding to all AP transmitting power combinations as an optimal power and channel configuration scheme of the whole network of the WLAN. Specifically, the integrated configuration selecting sub module 42 may select an AP transmitting power combination of which the service disruption ratio of the whole network of the WLAN is lowest from the optimal channel configuration schemes of the WLAN corresponding to all AP transmitting power combinations, and the AP transmitting power combination has been corresponding to an optimal channel configuration scheme of the WLAN, then the AP transmitting power combination and the optimal channel combination corresponding thereto (i.e. a channel combination included in the optimal channel configuration scheme) may be selected as the optimal power and channel configuration scheme of the WLAN. In a specific implementation, after the optimal power and channel configuration scheme of the WLAN are selected, then the power and channel configuration scheme may be used to complete power and channel configuration of the WLAN network.

In some practicable implementations, when selecting the optimal configuration scheme of the AP transmitting power combination and the channel combination according to the KPIs of the WLAN corresponding to all AP transmitting power combinations as calculated by the individual configuration selecting sub module 41, the integrated configuration selecting sub module 42 may also firstly treat the user dissatisfaction and the average load of the whole network of the WLAN corresponding to each AP transmitting power combination and each corresponding AP operating channel combination as optimization objectives, to acquire a set of channel configuration schemes with the optimal optimization objectives of each AP transmitting power combination and each corresponding AP operating channel combination; and then select, from the set of channel configuration schemes with the optimal optimization objectives, an AP transmitting power combination and an corresponding AP operating channel combination of which the service disruption ratio of the whole network of the WLAN is lowest, as the optimal power and channel configuration scheme of the WLAN. That is, the channel configuration scheme with the optimal optimization objectives may be found in the channel configuration schemes of all AP operating channel combinations corresponding to each AP transmitting power combinations through screening firstly, these channel configuration schemes with the strongest optimization objectives form a set, and then an AP transmitting power combination and an corresponding AP operating channel combination which enable the service disruption ratio of the whole network of the WLAN to be lowest are selected from the set as optimal power and channel configuration of the WLAN.

By means of acquiring estimated loads of APs through processing information such as a coverage area, transmitting power and channel information of the APs in a WLAN and a service requirement of the coverage area of the APs, and thus acquiring key performance indicators of the network such as user dissatisfaction, an average load, a service disruption ratio and distribution of signal to interference plus noise ratios or signal to noise ratios, and then selecting an optimal power and channel configuration scheme of the WLAN according to the key performance indicators of the WLAN, an apparatus for joint configuration of power and channel of the WLAN described in this embodiment can rapidly find the optimal power and channel configuration scheme of the WLAN, thereby improving power and channel adjusting efficiency of the WLAN, improving throughput and resource utilization of the WLAN, and increasing user experience and stickiness of the WLAN network.

Figure 6:
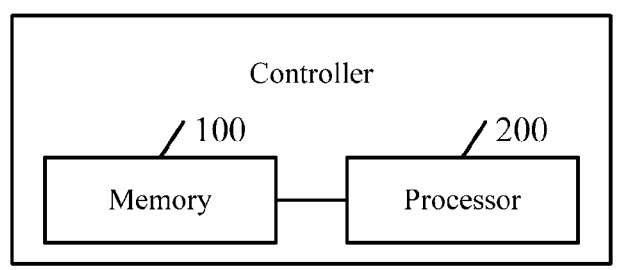
FIG. 6 is a schematic structural diagram of a controller according to an embodiment of the present disclosure.

Reference may be made to FIG. 6, which is a schematic structural diagram of a controller according to an embodiment of the present disclosure. The controller described in this embodiment includes:

A memory 100, configured to store an instruction.

A processor 200, configured to read the instruction from the memory, and perform, according to the instruction, operations of: selecting transmitting power of each AP from transmitting power ranges of APs of a WLAN to form an AP transmitting power combination, where, there are a plurality of the AP transmitting power combinations, and each of the AP transmitting power combinations includes the transmitting power of each AP; and determining a set of AP operating channel combinations corresponding to each AP transmitting power combination according to operating channels of the APs in the WLAN; calculating an estimated load of each AP corresponding to each AP operating channel combination in the set of AP operating channel combinations corresponding to each AP transmitting power combination, and calculating KPIs of the WLAN corresponding to each AP operating channel combination according to the estimated load of each AP; and selecting, according to the calculated KPIs of the WLAN, an optimal channel configuration scheme of the WLAN corresponding to each AP transmitting power combination, and selecting an optimal power and channel configuration scheme of the WLAN from the optimal channel configuration schemes of the WLAN corresponding to all AP transmitting power combinations.

In some practicable implementations, before selecting the transmitting power of each AP from the transmitting power ranges of the access points APs of the wireless local area network WLAN to form the AP transmitting power combination, the processor 200 is also configured to:

divide a coverage area of each of the APs of the WLAN into a plurality of sub areas, and setting a statistical cycle for services or power of the sub areas;

regularly receive, according to the statistical cycle, average service requirements, useful power, interference power and average channel detection thresholds of the sub areas of the coverage areas of the APs of the WLAN as obtained by the APs through statistics.

The useful power is average receiving power received by a user of the sub areas from its serving AP, and the interference power is average receiving power received by a user of the sub areas from adjacent APs.

In some practicable implementations, the WLAN network described in embodiments of the present disclosure may include a plurality of APs, and each AP has its own coverage area, where, there are a plurality of the AP transmitting power combinations, and each AP transmitting power combination includes the transmitting power of each AP in the WLAN described above. In a specific implementation, the processor 200 of the controller may select transmitting power of each AP according to transmitting power ranges of APs in the WLAN, that is, a specific transmitting power value of a specific AP may be selected from a transmitting power value range of the AP, and the selected transmitting power of each AP is joint to form an AP transmitting power combination. In a specific implementation, the controller may select a plurality of transmitting power for each AP, and selected transmitting power of APs is joint into a set of transmitting power combinations, where the set of transmitting power combinations above may include a plurality of AP transmitting power combinations.

After selecting an AP transmitting power combination, then the processor 200 of the controller may determine a set of AP operating channel combinations corresponding to the AP transmitting power combination according to information about operating channels of the APs in the AP transmitting power combination, where the set of AP operating channel combinations may include a plurality of AP operating channel combinations, that is, all AP operating channel combinations corresponding to the AP transmitting power combination may be determined. After determining the AP transmitting power combination and the set of corresponding AP operating channel combinations, then the processor 200 of the controller may calculate an estimated load of each AP corresponding to each AP operating channel combination according to the transmitting power combination.

In some practicable implementations, the processor 200 of the controller may divide a coverage area of each of the APs in the WLAN into a plurality of sub areas firstly, and set a statistical cycle for services or power of each sub area. After setting a statistical cycle for services or power of sub areas, then the processor 200 may regularly receive, according to the statistical cycle, an average service requirement, useful power, interference power and an average channel detection threshold of each of the sub areas as obtained by the APs through regularly statistics. Specifically, useful power of a specific sub area in the sub areas is mainly average receiving power received by a user of the sub area from its serving AP, for instance, useful power of a sub area i (the sub area i is one of sub areas divided from a coverage area of an $AP_c$, where the $AP_c$ is any one of a plurality of APs of the WLAN) is mainly average receiving power received by a user of the sub area i from the $AP_c$. Interference power of a specific sub area in the sub areas is average receiving power received by a user of the sub area from an adjacent AP, for instance, interference power of the sub area i is mainly average receiving power received by a user of the sub area i from adjacent APs.

In a specific implementation, after making statistics of the average service requirement, the useful power and the interference power of the coverage areas of the APs in the WLAN network, then the processor 200 may calculate estimated loads of the APs in the AP transmitting power combination by combining with the selected AP transmitting power combination and the corresponding AP operating channel combination.

In some practicable implementations, after determining a set of AP transmitting power combinations, then the controller may select an AP transmitting power combination therefrom, and calculate estimated loads of APs corresponding to the AP transmitting power combination according to a set of AP operating channel combinations corresponding to the AP transmitting power combination. Specifically, when estimated loads of APs corresponding to a specific AP transmitting power combination are calculated, an AP operating channel combination may be selected from a set of AP operating channel combinations corresponding to the AP transmitting power combination firstly, and an estimated load of each AP corresponding to the AP operating channel combination is calculated in combination with transmitting power of the APs in the AP transmitting power combination and operating channels corresponding thereto (that is, the selected operating channels). After acquiring the estimated load of each AP corresponding to the AP operating channel combination, then the controller may calculate KPIs of the WLAN corresponding to the AP operating channel combination according to the estimated load. The controller may calculate the estimated load of each AP and the KPIs of the WLAN corresponding to each AP operating channel combination in the set of AP operating channel combinations corresponding to the AP transmitting power combination according to the above approach, and select an AP operating channel combination (that is, an AP operating channel combination which minimizes a service disruption ratio of the whole network) which is mostly suitable for the AP transmitting power combination from the set of AP operating channel combinations corresponding to the AP transmitting power combination according to the obtained KPI.

In some practicable implementations, during a process of calculating the estimated load of each AP corresponding to each AP operating channel combination in the set of AP operating channel combinations corresponding to each AP transmitting power combination, when calculating an estimated load of any AP ($AP_c$) corresponding to any AP operating channel combination in a set of AP operating channel combinations corresponding to a specific AP transmitting power combination (an AP transmitting power combination x), the processor 200 is configured to:

calculate a signal to interference plus noise ratio or a signal to noise ratio of a sub area i, according to transmitting power of APs in the AP transmitting power combination x, noise power of the sub area i of a coverage area of the $AP_c$ and operating channels of APs in an AP operating channel combination corresponding to the AP transmitting power combination x and by combining with a channel gain from the sub area i to the $AP_c$ or channel gains from the sub area i to APs ($AP_a$s) in adjacent areas of the coverage area of the $AP_c$;

calculate a required transmission duration corresponding to an average service requirement of the sub area i, according to the signal to interference plus noise ratio or the signal to noise ratio of the sub area i and by combining with a channel bandwidth and the average service requirement of the sub area i;

calculate a total transmission duration required by all users of the $AP_c$, according to the required transmission duration corresponding to the average service requirement of the sub area i and by combining with signal interference or competition interference of the adjacent area of the coverage area of the $AP_c$ to which the sub area i belongs;

calculate a total transmission duration available for the $AP_c$ corresponding to a nominal rate of the $AP_c$, according to an average obtainable rate of the $AP_c$ and a protocol efficiency factor of a media access control MAC layer of the $AP_c$ and by combining with the nominal rate of the $AP_c$;

calculate an estimated load of the $AP_c$ according to the total transmission duration required by all users of the $AP_c$ and the total transmission duration available for the AP, corresponding to the nominal rate of the $AP_c$.

In a specific implementation, when calculating the required transmission duration corresponding to the average service requirement of the sub area i, according to the signal to interference plus noise ratio or the signal to noise ratio of the sub area i and by combining with the channel bandwidth and the average service requirement of the sub area i, the processor 200 is configured to:

calculate an obtainable rate of the sub area i according to the signal to interference plus noise ratio or the signal to noise ratio of the sub area i and by combining with the channel bandwidth of the sub area i;

calculate the required transmission duration corresponding to the average service requirement of the sub area i, according to the average service requirement of the sub area i and by combining with the obtainable rate of the sub area i.

In a specific implementation, the processor 200 may calculate a signal to interference plus noise ratio or a signal to noise ratio of a sub area i, according to transmitting power of APs in the AP transmitting power combination x (the AP transmitting power combination x is any AP transmitting power combination in the set of AP transmitting power combinations as pre-selected above), operating channels of APs in an AP operating channel combination corresponding to the AP transmitting power combination x and noise power of the sub area i (where, the sub area i is any one of sub areas divided from the coverage area of the $AP_C$) of a coverage area of the $AP_c$ (a specific AP corresponding to the above AP transmitting power combination), and by combining with a channel gain from the sub area i to the $AP_c$ or channel gains from the sub area i to APs (e.g., $AP_d$) of adjacent areas of the coverage area of the $AP_c$. Specifically, when calculating an estimated load of any AP ($AP_c$) corresponding to any specific AP transmitting power combination (e.g., an AP transmitting power combination x), the processor 200 may calculate a signal to interference plus noise ratio or a signal to noise ratio of a sub area i, according to transmitting power of APs in the AP transmitting power combination x, and noise power of the sub area i of a coverage area of the $AP_c$, and by combining with a channel gain from the sub area i to the $AP_c$ or channel gains from the sub area i to APs ($AP_d$s) an adjacent areas of the covrage area of $AP_c$. Specifically, a calculating method for the processor 200 to calculate the signal to interference plus noise ratio or the signal to noise ratio $SINR_i$ of the sub area i is as follow:

$$SINR_i = \frac{P_c h_{i,c}}{P^{noise} + \sum_{d \in ANR_c}(1-\alpha_{i,d})x_{c,d}P_d h_{i,d}}$$

$P_c$ in the above equation is the transmitting power of the AP (that is, $AP_C$) of the coverage area to which the sub area i belongs in the selected AP transmitting power combination; $P_d$ is the transmitting power of the adjacent AP (such as the $AP_d$) of the $AP_c$ in the selected AP transmitting power combination; $P^{noise}$ is the noise power of the sub area i, and $ANR_c$ is a set of adjacent areas of the coverage area of the $AP_c$. Furthermore, the channel gain from the sub area i to the $AP_c$ is a ratio of average power of the $AP_c$ received by the user of the sub area i to current transmitting power of the $AP_c$, that is, $$h_{i,c} = \frac{P_{i,c}}{P_c}$$

$P_{i,c}$ in the above equation is average receiving power of signals received by the user of the sub area i from the $AP_c$, which may be obtained by averaging receiving power reported by the user of the sub area i, and $P_c$ in the above equation is then current transmitting power of the $AP_c$.

Specifically, the channel gain $h_{i,d}$ from the sub area i to the adjacent AP (such as $AP_d$) of the $AP_c$ is a ratio of average power of the $AP_d$ received by the user of the sub area i to current transmitting power of the $AP_d$, that is, $$h_{i,d} = \frac{P_{i,d}}{P_d}$$

$P_{i,d}$ in the above equation is average receiving power of signals received by the user of the sub area i from the $AP_d$, which may be obtained by averaging receiving power reported by the user of the sub area i, and $P_d$ in the above equation is then current transmitting power of the $AP_d$.

In a specific implementation, a method for determining values of $x_{c,d}$ and $\alpha_{i,d}$ in the formulae for calculating the signal to interference plus noise ratio or the signal to noise ratio of the sub area i is as follow:

$$x_{c,d} = \begin{cases} 0, & \text{operating channels of the } AP_c \text{ and the } AP_d \text{ are different} \\ 1, & \text{otherwise} \end{cases};$$

$$\alpha_{i,d} = \begin{cases} 0, & P_{i,d} < CCA_i \\ 1, & \text{otherwise} \end{cases}$$

That is, when operating channels of the $AP_c$ and the $AP_d$ are different (i.e. the operating channels of the $AP_c$ and the $AP_d$ are not consistent in the selected AP operating channel combination), $x_{c,d}$ is 0, otherwise, $x_{c,d}$ is 1; when the $P_{i,d}$ is less than the $CCA_i$, $\alpha_{i,d}$ is 0, otherwise, $\alpha_{i,d}$ is 1. Where, $\alpha_{i,d}=0$ represents load increases caused by an interference domain, $\alpha_{i,d}=1$ represents load increases caused by a transmission domain (competition), and $CCA_i$ is an average channel detection threshold of the sub area i.

It can be know from definitions of the variables in the method for calculating the signal to interference plus noise ratio or the signal to noise ratio $SINR_i$ of the sub area i, when the average receiving power from the $AP_d$ (that is, $P_{i,d}$) of the sub area i is less than the average channel detection threshold (that is, $CCA_i$) of the sub area i, then the signal to interference plus noise ratio of the sub area i may be calculated by combining with the channel gain from the sub area i to the $AP_c$ and the channel gains from the sub area i to the $AP_d$, that is, there are load increases caused by the interference domain in the sub area i at this time; when the average receiving power from the $AP_d$ (that is, $P_{i,d}$) of the sub area i is greater than or equal to the average channel detection threshold (that is, $CCA_i$) of the sub area i, then the signal to noise ratio of the sub area i may be calculated by combining with the channel gain from the sub area i to the $AP_c$ (that is, there is no need to take the channel gains from the sub area i to the $AP_d$ into consideration at this time), that is, there are load increases caused by the transmission domain in the sub area i at this time, and the load increase caused by the interference domain does not exist.

In some practicable implementations, after obtaining the signal to interference plus noise ratio or the signal to noise ratio $SINR_i$ of the sub area i, then the processor 200 may calculate a required transmission duration corresponding to a user service requirement of the sub area i by combining with the channel bandwidth and the user service requirement (that is, the average service requirement of the sub area i obtained by the statistics above) of the sub area i. Specifically, the processor 200 may calculate an obtainable rate $R_i$ of the sub area i, according to the signal to interference plus noise ratio or the signal to noise ratio of the sub area i of the $AP_c$ and by combining with the channel bandwidth of the sub area i, that is, the obtainable rate of the sub area i of the $AP_c$ is:

$$R_i = k_c^{sch} \eta^{BW} W \log_2(1 + \eta^{SINR} SINR_i)$$

$k_c^{sch}$, $\eta^{BW}$ and $\eta^{SINR}$ in the above equation are a scheduler coefficient, a channel bandwidth coefficient, a signal to interference plus noise ratio or a signal to noise ratio coefficient of the $AP_c$ respectively, and W is the channel bandwidth.

After obtaining the obtainable rate for the sub area i, then the processor 200 of the terminal may calculate the required transmission duration corresponding to the user service requirement of the sub area by combining with the user service requirement of the sub area i, thus, it can be seen that the required transmission duration corresponding to the sub area i of which the user service requirement is $D_i$ is:

$$T_i = \frac{D_i}{R_i} + \sum_{d \in ANR_c} \alpha_{i,d} x_{c,d} T'_d$$

where, $$T'_d = \sum_{j \in AP_d} \frac{D_j}{R_j}$$

is the user transmission duration of the adjacent area of the coverage area of the $AP_c$.

In some practicable implementations, after obtaining the required transmission duration corresponding to the user service requirement of the sub area i, then the processor 200 may calculate a total transmission duration required by all users of the AP by combining with signal interference or competition interference of the sub area i. That is, for the $AP_c$, the total transmission duration required by all the users may be represented by:

$$T_c = \sum_{i \in AP_c} \frac{D_i}{R_i} + \sum_{d \in ANR_c} \min\left(\sum_{i \in AP_c} \alpha_{i,d}, 1\right) x_{c,d} \cdot T'_d$$

A first item in the above equation includes the obtainable rate of the sub area i, a factor such as the transmitting power of the adjacent area of the coverage area of the $AP_c$ is taken into consideration, thus it can be seen that signal interference of the adjacent area of the coverage area of the $AP_c$ is taken into consideration; furthermore, a second item in the above equation takes competition interference of the adjacent area of the coverage area of the $AP_c$ into consideration. Thus, it can be seen from the above equation that, when the average receiving power from the adjacent AP of the sub area i is less than an average channel detection threshold of the sub area i, the total transmission duration required by all users of the $AP_c$ is a sum of required transmission durations corresponding to the average service requirement of all sub areas of the coverage area of the $AP_c$; when the average receiving power from the adjacent AP of the sub area i is greater than or equal to the average channel detection threshold of the sub area i, the total transmission duration required by all users of the $AP_c$ is a sum of required transmission durations corresponding to the average service requirement of all sub areas of the coverage area of the $AP_c$ plus transmission durations of all users of the adjacent AP. That is, carrier characteristics and interference of the WLAN are taken into consideration during the calculation of the estimated load of the $AP_c$, and accuracy of the estimated load may be greatly increased by combining with channel allocation.

In some practicable implementations, after obtaining the total transmission duration required by all users of the $AP_c$, the processor 200 may also calculate a total transmission duration available for the $AP_c$ corresponding to a nominal rate of the $AP_c$, according to an average obtainable rate of the $AP_c$ and a protocol efficiency factor of an MAC layer of the $AP_c$ and by combining with the nominal rate of the $AP_c$, the total transmission duration available for the $AP_c$ of which the nominal rate is $C_c$ is:

$$T_{total,c} = \frac{C_c \eta_c}{R_{avg,c}}$$

The average obtainable rate of the $AP_c$ may be:

$$R_{avg,c} = \frac{1}{|AP_c|} \sum_{i \in AP_c} R_i$$

$|AP_c|$ is the total number of users of the $AP_c$. $\eta_c$ is the protocol efficiency factor of the MAC layer of the $A_c$, P which may be obtained by the following expression:

$$\eta_c = \frac{P_{tr} P_s T_s}{(1 - P_{tr})\sigma + P_{tr} P_s T_s + P_{tr}(1 - P_s) T_c}$$

Meanings and values of items in the above expression are shown in Table 3:

TABLE 3

| | |
|---|---|
| $T_s$ | Average time duration required for successfully transmitting a packet, a statistic is taken |
| $T_c$ | Average time duration of a packet collision, a statistic is taken |
| $\sigma$ | A slot length of the MAC layer, being a system constant |
| q | Packet arrival probability, depending on a service model |
| $\tau$ | A probability for any station to transmit data within a random slot |
| p | Packet collision probability |
| $P_s = \frac{n\tau(1-\tau)^{n-1}}{1-(1-\tau)^n}$ | Successful transmission probability |
| $P_{tr} = 1 - (1-\tau)^n$ | A probability of having packet transmission |

The packet collision probability p and the data transmission probability $\tau$ in Table 3 described above may be obtained by the following equations:

$$\begin{cases} p = 1 - (1-\tau)^{n-1} \\ \tau = b_{(0,0)} \dfrac{q^2}{1-q} \left( \dfrac{W_0}{(1-p)(1-(1-q))^{W_0}} - (1-p) \right) \end{cases}$$

Specifically, in the above equations, $W_o$ is an initial contention window, and has the following relationship with the $b_{(0,0)}$ in the above equation:

$$1/b_{(0,0)e} = (1-q) + \dfrac{q^2 W_0(W_0+1)}{2(1-(1-q)^{W_0})} +$$

$$\dfrac{q(W_0+1)}{2(1-q)} \left( \dfrac{q^2 W_0}{1-(1-q)^{W_0}} + p(1-q) - q(1-p)^2 \right) +$$

$$\dfrac{pq^2}{2(1-q)(1-p)} \left( \dfrac{W_0}{1-(1-q)^{W_0}} - (1-p)^2 \right) \left( 2W_0 \dfrac{1-p-p(2p)^{m-1}}{1-2p} + 1 \right)$$

m is the maximum retransmission times, and n is the number of terminals associated with the $AP_c$.

In some practicable implementations, after the total transmission duration $T_c$ required by all users of the $AP_c$ and the total transmission duration $T_{total,c}$ available for the $AP_c$ corresponding to the nominal rate of the $AP_c$ are obtained, then an estimated load of the $AP_c$ may be calculated. A formula for calculating the estimated load of the $AP_c$ is as follow:

$$\hat{\rho}_c = \dfrac{T_c}{T_{total,c}}$$

In a specific implementation, after obtaining the estimated load of each AP (e.g., the $AP_C$), then the controller may calculate KPIs of the WLAN corresponding to the AP transmitting power combination (e.g., the AP transmitting power combination x) under the AP operating channel combination according to the estimated load of the $AP_c$. Likewise, the processor 200 may calculate estimated loads of the AP, and corresponding KPIs of the WLAN under other AP operating channel combinations according to the above approach. Furthermore, the controller may also calculate an estimated load of each AP corresponding to each AP transmitting power combination according to the method for calculating the estimated load of the $AP_c$ corresponding to the AP transmitting power combination x, that is, the estimated load of each AP and the corresponding KPIs of the WLAN may be calculated for each AP transmitting power combination under all the corresponding AP operating channel combinations.

In some practicable implementations, there may be a plurality of KPIs of the WLAN, which may be user dissatisfaction, a service disruption ratio of an AP and distribution of signal to interference plus noise ratios or signal to noise ratios of an AP, that is, the KPIs of the WLAN may include: user dissatisfaction of the whole network of the WLAN, a service disruption ratio of the whole network of the WLAN, an average load of the whole network of the WLAN and distribution of signal to interference plus noise ratios or signal to noise ratios of the whole network of the WLAN. In a specific implementation, after obtaining the estimated load of each AP, then the terminal may calculate the KPIs of the WLAN corresponding to each AP operating channel combination in the set of AP operating channel combinations corresponding to each AP transmitting power combination according to the estimated load of each AP as obtained and quantity of users of each AP, that is, the KPI of the whole network.

In some practicable implementations, when the KPI of the WLAN is the user dissatisfaction of the WLAN, when calculating the KPI of the WLAN corresponding to each AP operating channel combination according to the estimated load of each AP, the processor 200 is configured to:

Calculate the user dissatisfaction of the WLAN corresponding to each AP operating channel combination according to the estimated load of each AP corresponding to each AP operating channel combination, quantity of users of each AP and quantity of APs in the whole network of the WLAN.

In a specific implementation, based on the estimated load of each AP, the processor 200 may obtain the user dissatisfaction of the whole network as follow:

$$f_{UDR}(B, M) = \dfrac{\sum_{c \in AP} \max(M_c \cdot (1 - 1/\hat{\rho}_c), 0)}{\sum_{c \in AP} M_c}$$

The AP in the above equation is a set of APs of the whole network, $M_c$ is the number of users of the $AP_c$, B refers to different channel configuration schemes, that is, channel configuration schemes of the WLAN corresponding to different AP transmitting power combinations, and M refers to the number of users of the AP. In a specific implementation, the processor 200 may obtain different estimated loads of each AP according to AP transmitting power in different AP transmitting power combinations, thereby obtaining different user dissatisfactions, and optimization of the user dissatisfactions may improve user experience of the coverage area of the AP and edge areas thereof.

In some practicable implementations, when the KPI of the WLAN is the service disruption ratio of the WLAN, when calculating the KPI of the WLAN corresponding to each AP operating channel combination according to the estimated load of each AP, the processor 200 is configured to:

Calculate the service disruption ratio of the WLAN corresponding to each AP transmitting power combination according to the estimated load of each AP corresponding to each AP operating channel combination, quantity of users of each AP, status of a previous operating channel and a newly allocated channel of each AP and quantity of APs in the whole network of the WLAN.

In a specific implementation, based on the estimated load of each AP, the processor may also obtain the service disruption ratio of the whole network as follow:

$$f_{SI}(B, B^{pre}, M) = \dfrac{\sum_{c \in AP} (b_c \neq b_c^{pre}) M_c \cdot \min(\hat{\rho}_c, 1)}{\sum_{c \in AP} M_c}$$

$B_c$ and $B^{pre}$ in the above equation are a newly allocated channel and a previous channel of the $AP_c$ respectively. In a specific implementation, the processor 200 may obtain different estimated loads of each AP according to AP transmitting power in different AP transmitting power combinations, thereby obtaining different service disruption ratios of the whole network. Optimization of the service disruption ratios may reduce cost for spectrum configuration, and further improve user experience.

In some practicable implementations, when the KPI of the WLAN is the distribution of the signal to interference plus noise ratios or the signal to noise ratios of the WLAN, when calculating the KPI of the WLAN corresponding to each AP operating channel combination according to the estimated load of each AP, the processor 200 is configured to:

accumulate distribution of signal to interference plus noise ratios or signal to noise ratios of each AP corresponding to each AP operating channel combination, and combine with a total number of APs of the whole network of the WLAN, calculate the distribution of the signal to interference plus noise ratios or the signal to noise ratios of the whole network of the WLAN corresponding to each AP operating channel combination.

In some practicable implementations, when calculating the KPIs of the WLAN corresponding to each AP operating channel combination according to the estimated load of each AP, the processor 200 is also configured to:

accumulate the estimated load of each AP corresponding to each AP operating channel combination, and combine with a total number of APs in the whole network of the WLAN, calculate the average load of the whole network of the WLAN corresponding to each AP operating channel combination.

In a specific implementation, based on the estimated load of each AP, the processor 200 may also obtain the average load of the whole network as follow:

$$f_{m-load}(B, M) = \frac{\sum_{c \in AP} \hat{P}_c}{|AP|}$$

|AP| as described above is the total number of APs in the whole network. The processor 200 may obtain different estimated loads of each AP according to AP transmitting power in different AP transmitting power combinations, thereby obtaining different average loads of the whole network, specifically, optimization of the average loads of the whole network may increase network capacity, and improve user experience of the network.

Furthermore, based on the distribution of the signal to interference plus noise ratios or the signal to noise ratios $SINR_c$ of each AP corresponding to each AP transmitting power combination as obtained through processing, the processor 200 may obtain distribution of signal to interference plus noise ratios or signal to noise ratios SINR of the whole network as follow:

$$f_{SINR}(P, B) = \frac{\sum_{c \in AP} SINR_c}{|AP_c|}$$

$SINR_c$ in the above equation is distribution of signal to noise ratios of the $AP_c$, B refers to different channel configuration schemes, and P refers to different power configuration schemes.

In some practicable implementations, when selecting, according to the calculated KPIs of the WLAN, the optimal power and channel configuration scheme of the WLAN corresponding to each AP transmitting power combination, the processor 200 is configured to:

treat the user dissatisfaction and the average load of the whole network of the WLAN corresponding to each AP operating channel combination in the set of AP operating channel combinations corresponding to each AP transmitting power combination as optimization objectives, and acquire a set of channel configuration schemes with optimal optimization objectives corresponding to each AP transmitting power combination;

calculate the service disruption ratio of the whole network of the WLAN corresponding to each configuration scheme in the set of channel configuration schemes with the optimal optimization objectives corresponding to each AP transmitting power combination, and select, from the set of channel configuration schemes with the optimal optimization objectives corresponding to each AP transmitting power combination, a configuration scheme of which the service disruption ratio is lowest as the optimal channel configuration scheme of the WLAN corresponding to each AP transmitting power combination.

In some practicable implementations, after obtaining the KPIs of the WLAN corresponding to each AP transmitting power combination, i.e. the user dissatisfaction of the whole network, the service disruption ratios of the whole network, the average load of the whole network and the distribution of the signal to interference plus noise ratios or the signal to noise ratios SINR of the whole network, then the processor 200 may select an optimal power and channel configuration scheme of the WLAN corresponding to each AP transmitting power combination according to the KPIs of the WLAN described above. In a specific implementation, embodiments of the present disclosure mainly uses a particle swarm optimization algorithm to select the optimal channel configuration scheme of the WLAN corresponding to each AP operating channel corresponding to each AP transmitting power combination, where a calculating process of the above particle swarm optimization algorithm may include steps of:

(1) initializing, by a particle swarm, an initial-generation individual, that is, a power and channel (or spectrum) distribution scheme required in this embodiment;

(2) assessing particles, that is, calculating KPI values corresponding to all current particles;

(3) grading the particles based on the assessment thereof, and calculating an intensity of each grade;

(4) calculating a current optimal position of the individual and a current optimal position of the swarm;

(5) updating particle velocities and positions;

(6) using a mutation and a crossover to produce a portion of new particle positions so as to add them into the particle swarm, where the mutation selects several current-generation individuals for stochastic disturbance to generate a quality mutated individual, a joint individual and the mutated individual form a next-generation to enter a next cycle, where the joint individual is generated by the crossover through selecting and crossing several current-generation individuals.

In some practicable implementations, the processor 200 may treat the user dissatisfaction of the whole network and the average load of the whole network and etc. of the WLAN corresponding to each AP operating channel combination in the set of AP operating channel combinations corresponding to each AP transmitting power combination as optimization objectives of the particle swarm optimization algorithm firstly (that is, as the assessed particles of the particle swarm optimization algorithm for assessment and calculation), acquire a set of channel configuration schemes with optimal optimization objectives corresponding to each AP transmitting power combination through the calculation using the particle swarm optimization algorithm (since an AP operating channel combination may be corresponding to a configuration scheme corresponding to an AP transmitting power combination, an AP transmitting power combination may be corresponding to a set of AP operating channel combinations, that is, a plurality of AP operating channel combinations, then each AP transmitting power combination may be corresponding to a set of optimal power and channel configuration schemes), and then calculate the service disruption ratio of the whole network of the WLAN corresponding to each configuration scheme in the set of optimal channel configuration schemes of the optimization objectives corresponding to each AP transmitting power combination as acquired, and select therefrom a configuration scheme of which the service disruption ratio is lowest, and the configuration scheme is then selected as the optimal power and channel configuration scheme of the WLAN corresponding to the AP transmitting power combination.

In some practicable implementations, after obtaining the optimal power and channel configuration scheme of the WLAN corresponding to each AP transmitting power combination, then the processor 200 may select the configuration scheme of which the service disruption ratio is lowest from the optimal configuration schemes corresponding to all AP transmitting power combinations as an optimal power and channel configuration scheme of the whole network of the WLAN. Specifically, the processor 200 may select an AP transmitting power combination of which the service disruption ratio of the whole network of the WLAN is lowest from the optimal channel configuration schemes of the WLAN corresponding to all AP transmitting power combinations, and the AP transmitting power combination has been corresponding to an optimal channel configuration scheme of the WLAN, then the AP transmitting power combination and the corresponding optimal channel combination (i.e. a channel combination included in the optimal channel configuration scheme) may be selected as the optimal power and channel configuration scheme of the WLAN. After selecting the optimal power and channel configuration scheme of the WLAN, then the controller may use the power and channel configuration scheme to complete configuration of power and channel of the WLAN network.

In some practicable implementations, when selecting the optimal configuration scheme of the AP transmitting power combination and the channel combination according to the KPIs of the WLAN corresponding to all AP transmitting power combinations as calculated, the processor 200 may also firstly treat the user dissatisfaction and the average load of the whole network of the WLAN corresponding to each AP transmitting power combination and each corresponding AP operating channel combination as optimization objectives, to acquire a set of channel configuration schemes with the optimal optimization objectives of each AP transmitting power combination and each corresponding AP operating channel combination; and then select, from the set of channel configuration schemes with the optimal optimization objectives, an AP transmitting power combination and an corresponding AP operating channel combination of which the service disruption ratio of the whole network of the WLAN is lowest, as the optimal power and channel configuration scheme of the WLAN. That is, the controller may find the channel configuration scheme with the optimal optimization objectives in the channel configuration schemes of all AP operating channel combinations corresponding to each AP transmitting power combination through screening firstly, these channel configuration schemes with the strongest optimization objectives form a set, and then an AP transmitting power combination and an corresponding AP operating channel combination which enables the service disruption ratio of the whole network of the WLAN to be lowest are selected from the set as optimal power and channel configuration of the WLAN.

By means of acquiring estimated loads of APs through processing information such as a coverage area, transmitting power and channel information of the APs in a WLAN and a service requirement of the coverage area of the APs, and thus acquiring key performance indicators of the network such as user dissatisfaction, an average load, a service disruption ratio and distribution of signal to noise ratios, and then selecting an optimal power and channel configuration scheme of the WLAN according to the key performance indicators of the WLAN, a terminal described in this embodiment can rapidly find the optimal power and channel configuration scheme of the WLAN, thereby improving power and channel adjusting efficiency of the WLAN, improving throughput and resource utilization of the WLAN, and increasing user experience and stickiness of the WLAN network.

Persons of ordinary skill in the art may understand that, all or a part of processes of the foregoing method embodiments may be implemented by a computer program instructing relevant hardware. The foregoing program may be stored in a computer readable storage medium. When the program runs, the processes of the foregoing method embodiments are included. The foregoing storage medium may be a magnetic disk, an optical disc, a read-only memory (ROM), a random access memory (RAM), or the like.

The descriptions disclosed above are merely preferred embodiments of the present disclosure, and certainly cannot be used to limit the scope of the claims of the present disclosure, thus, equivalent modifications which are made according to the claims of the present disclosure still fall into the protection scope of the present disclosure.

What is claimed is:

1. A method for joint configuration of power and channel of a wireless local area network (WLAN), comprising:
    selecting transmitting power of each access point (AP) from transmitting power ranges of APs of the WLAN to form one of a plurality of AP transmitting power combinations, wherein each of the AP transmitting power combinations comprises the transmitting power of each AP;
    determining a set of AP operating channel combinations corresponding to each AP transmitting power combination according to operating channels of the APs in the WLAN, wherein the set of AP operating channel combinations comprises a plurality of AP operating channel combinations;
    obtaining an estimated load of each AP corresponding to each AP operating channel combination in the set of AP operating channel combinations corresponding to each AP transmitting power combination, and obtaining key performance indicators (KPIs) of the WLAN corresponding to each AP operating channel combination according to the estimated load of each AP; and
    selecting, according to the obtained KPIs of the WLAN, an optimal channel configuration scheme of the WLAN corresponding to each AP transmitting power combination, and selecting an optimal power and channel configuration scheme of the WLAN from the optimal channel configuration schemes of the WLAN corresponding to all the plurality of the AP transmitting power combinations.

2. The method according to claim 1, wherein, before the selecting the transmitting power of each AP from the transmitting power ranges of the APs of the WLAN to form the AP transmitting power combination, comprising:
    dividing a coverage area of each of the APs of the WLAN into a plurality of sub areas, and setting a statistical cycle for services or power of the sub areas; and
    regularly receiving, according to the statistical cycle, average service requirements, useful power, interference power and average channel detection thresholds of the sub areas of the coverage areas of the APs of the WLAN as obtained by the APs through statistics;
    wherein the useful power is average receiving power received by a user of the sub areas from its serving AP, and the interference power is average receiving power received by a user of the sub areas from its adjacent APs.

3. The method according to claim 1, wherein, during the process of obtaining the estimated load of each AP corresponding to each AP operating channel combination in the set of AP operating channel combinations corresponding to each AP transmitting power combination, obtaining an estimated load of any AP ($AP_c$) corresponding to any AP operating channel combination in a set of AP operating channel combinations corresponding to a specific AP transmitting power combination (an AP transmitting power combination x), comprises:
   obtaining a signal to interference plus noise ratio or a signal to noise ratio of a sub area i, according to transmitting power of APs in the AP transmitting power combination x, noise power of the sub area i of a coverage area of the $AP_c$ and operating channels of APs in an AP operating channel combination corresponding to the AP transmitting power combination x and by combining with a channel gain from the sub area i to the $AP_c$ or channel gains from the sub area i to adjacent APs ($AP_d$s);
   obtaining a required transmission duration corresponding to an average service requirement of the sub area i, according to the signal to interference plus noise ratio or the signal to noise ratio of the sub area i and by combining with a channel bandwidth and the average service requirement of the sub area i;
   obtaining a total transmission duration required by all users of the AP, according to the required transmission duration corresponding to the average service requirement of the sub area i and by combining with signal interference or competition interference of the sub area i;
   obtaining a total transmission duration available for the $AP_c$ corresponding to a nominal rate of the $AP_c$, according to an average obtainable rate of the $AP_c$ and a protocol efficiency factor of a media access control (MAC) layer of the $AP_c$ and by combining with the nominal rate of the $AP_c$; and
   obtaining an estimated load of the $AP_c$, according to the total transmission duration required by all users of the $AP_c$ and the total transmission duration available for the $AP_c$ corresponding to the nominal rate of the $AP_c$.

4. The method according to claim 3, wherein the obtaining the signal to interference plus noise ratio or the signal to noise ratio of the sub area i by combining with the channel gain from the sub area i to the $AP_c$ or the channel gains from the sub area i to the adjacent APs ($AP_d$s), comprises:
   when the average receiving power, which is from the $AP_d$, of the sub area i is less than an average channel detection threshold of the sub area i, obtaining the signal to interference plus noise ratio of the sub area i by combining with the channel gain from the sub area i to the $AP_c$ and the channel gain from the sub area i to the $AP_d$; or
   when the average receiving power, which is from the adjacent APs (the $AP_d$s), of the sub area i is greater than or equal to the average channel detection threshold of the sub area i, obtaining the signal to noise ratio of the sub area i by combining with the channel gain from the sub area i to the $AP_c$.

5. The method according to claim 4, wherein the KPIs of the WLAN comprise: user dissatisfaction of the whole network of the WLAN, a service disruption ratio of the whole network of the WLAN, an average load of the whole network of the WLAN and distribution of signal to interference plus noise ratios or signal to noise ratios of the whole network of the WLAN.

6. The method according to claim 5, wherein the selecting, according to the obtained KPIs of the WLAN, the optimal channel configuration scheme of the WLAN corresponding to each AP transmitting power combination comprises:
   treating the user dissatisfaction and the average load of the whole network of the WLAN corresponding to each AP operating channel combination in the set of AP operating channel combinations corresponding to each AP transmitting power combination as optimization objectives, and acquiring a set of channel configuration schemes with optimal optimization objectives corresponding to each AP transmitting power combination; and
   obtaining the service disruption ratio of the whole network of the WLAN corresponding to each configuration scheme in the set of channel configuration schemes with the optimal optimization objectives corresponding to each AP transmitting power combination, and selecting, from the set of channel configuration schemes with the optimal optimization objectives corresponding to each AP transmitting power combination, a configuration scheme of which the service disruption ratio is lowest as the optimal channel configuration scheme of the WLAN corresponding lo each AP transmitting power combination.

7. The method according to claim 6, wherein the selecting the optimal power and channel configuration scheme of the WLAN from the optimal channel configuration schemes of the WLAN corresponding to all AP transmitting power combinations comprises:
   selecting, from the optimal channel configuration schemes of the WLAN corresponding to all AP transmitting power combinations, an AP transmitting power combination of which the service disruption ratio of the whole network of the WLAN is lowest, and selecting the AP transmitting power combination and the corresponding optimal channel combination as the optimal power and channel configuration scheme of the WLAN.

8. The method according to claim 5, wherein, when the KPI of the WLAN is the user dissatisfaction of the WLAN, the obtaining the key performance indicator KPI of the WLAN corresponding to each AP operating channel combination according to the estimated load of each AP comprises:
   obtaining the user dissatisfaction of the WLAN corresponding to each AP operating channel combination according to the estimated load of each AP corresponding to each AP operating channel combination, a quantity of users of each AP and a quantity of APs of the whole network of the WLAN; or
   when the KPI of the WLAN is the service disruption ratio of the WLAN, the obtaining the key performance indicator KPI of the WLAN corresponding to each AP operating channel combination according to the estimated load of each AP comprises:
   obtaining the service disruption ratio of the WLAN corresponding to each AP operating channel combination according to the estimated load of each AP corresponding to each AP operating channel combination, a quantity of users of each AP, a status of a previous operating channel and a newly-allocated operating channel of each AP and quantity of APs in the whole network of the WLAN; or
   when the KPI of the WLAN is the distribution of the signal to interference plus noise ratios or the signal to noise ratios of the WLAN, the obtaining the key performance indicator KPI of the WLAN corresponding to each AP operating channel combination according to the estimated load of each AP comprises:

accumulating distribution of signal to interference plus noise ratios or signal to noise ratios of each AP corresponding to each AP operating channel combination, and combining with a total number of APs of the whole network of the WLAN, obtaining the distribution of the signal to interference plus noise ratios or the signal to noise ratios of the whole network of the WLAN corresponding to each AP operating channel combination; or the obtaining the key performance indicator KPIs of the WLAN corresponding to each AP operating channel combination according to the estimated load of each AP further comprises:

accumulating the estimated load of each AP corresponding to each AP operating channel combination, and combining with a total number of APs in the whole network of the WLAN, obtaining the average load of the whole network of the WLAN corresponding to each AP operating channel combination.

9. The method according to claim 3, wherein the obtaining the required transmission duration corresponding to the average service requirement of the sub area i, according to the signal to interference plus noise ratio or the signal to noise ratio of the sub area i and by combining with the channel bandwidth and the average service requirement of the sub area i, comprises:

obtaining an obtainable rate of the sub area i according to the signal to interference plus noise ratio or the signal to noise ratio of the sub area i and by combining with the channel bandwidth of the sub area i;

obtaining the required transmission duration corresponding to the average service requirement of the sub area i, according to the average service requirement of the sub area i and by combining with the obtainable rate of the sub area i.

10. The method according to claim 9, wherein the obtaining the total transmission duration required by all users of the $AP_c$, according to the required transmission duration corresponding to the average service requirement of the sub area i and by combining with the signal interference or the competition interference of the sub area i, comprises:

when the average receiving power, which is from the adjacent APs, of the sub area i is less than an average channel detection threshold of the sub area i, obtaining a sum of required transmission durations corresponding to average service requirements of all sub areas of a coverage area of the $AP_c$, that is, the total transmission duration required by all users of the $AP_c$; or when the average receiving power, which is from the adjacent APs, of the sub area i is greater than or equal to an average channel detection threshold of the sub area i, obtaining a sum of required transmission durations corresponding to average service requirements of all sub areas of a coverage area of the $AP_c$, plus transmission durations of all users of the adjacent APs, that is, the total transmission durations required by all users of the $AP_c$.

11. A controller, comprising:
a memory, configured to store instructions;
a processor, configured to read the instructions from the memory, and perform, according to the instructions, operations of:

selecting transmitting power of each access point (AP) from transmitting power ranges of APs of a wireless local area network (WLAN) to form one of a plurality of AP transmitting power combinations, wherein each of the AP transmitting power combinations comprises the transmitting power of each AP; and determining a set of AP operating channel combinations corresponding to each AP transmitting power combination according to operating channels of the APs in the WLAN, wherein the set of AP operating channel combinations comprises a plurality of AP operating channel combinations; obtaining an estimated load of each AP corresponding to each AP operating channel combination in the set of AP operating channel combinations corresponding to each AP transmitting power combination, and obtaining key performance indicators (KPIs) of the WLAN corresponding to each AP operating channel combination according to the estimated load of each AP; and selecting, according to the obtained KPIs of the WLAN, an optimal channel configuration scheme of the WLAN corresponding to each AP transmitting power combination, and selecting an optimal power and channel configuration scheme of the WLAN from the optimal channel configuration schemes of the WLAN corresponding to all the plurality of the AP transmitting power combinations.

12. The controller according to claim 11, wherein, before selecting the transmitting power of each AP from the transmitting power ranges of the APs of the WLAN to form the AP transmitting power combination, the processor is also configured to:

divide a coverage area of each of the APs of the WLAN into a plurality of sub areas, and setting a statistical cycle for services or power of the sub areas; and regularly receive, according to the statistical cycle, average service requirements, useful power, interference power and average channel detection thresholds of the sub areas of the coverage areas of the APs of the WLAN as obtained by the APs through statistics;

wherein the useful power is average receiving power received by a user of the sub areas from its serving AP, and the interference power is average receiving power received by a user of the sub areas from its adjacent APs.

13. The controller according to claim 11, wherein, during the process of obtaining the estimated load of each AP corresponding to each AP operating channel combination in the set of AP operating channel combinations corresponding to each AP transmitting power combination, when calculating an estimated load of any AP ($AP_c$) corresponding to any AP operating channel combination in a set of AP operating channel combinations corresponding to a specific AP transmitting power combination (an AP transmitting power combination x), the processor is configured to:

obtain a signal to interference plus noise ratio or a signal to noise ratio of a sub area i, according to transmitting power of APs in the AP transmitting power combination x, noise power of the sub area i of a coverage area of the $AP_c$ and operating channels of APs in an AP operating channel combination corresponding to the AP transmitting power combination x and by combining with a channel gain from the sub area i to the $AP_c$ or channel gains from the sub area i to adjacent APs ($AP_d$s);

obtain a required transmission duration corresponding to an average service requirement of the sub area i, according to the signal to interference plus noise ratio or the signal to noise ratio of the sub area i and by combining with a channel bandwidth and the average service requirement of the sub area i;

obtain a total transmission duration required by all users of the $AP_c$, according to the required transmission duration corresponding to the average service requirement of the sub area i and by combining with signal interference or competition interference of the sub area i;

obtain a total transmission duration available for the $AP_c$ corresponding to a nominal rate of the $AP_c$, according to an average obtainable rate of the $AP_c$ and a protocol efficiency factor of a media access control (MAC) layer of the $AP_c$ and by combining with the nominal rate of the $AP_c$; and obtain an estimated load of the $AP_c$ according to the total transmission duration required by all users of the $AP_c$ and the total transmission duration available for the AP, corresponding to the nominal rate of the $AP_c$.

14. The controller according to claim 13, wherein, when obtaining the signal to interference plus noise ratio or the signal to noise ratio of the sub area i by combining with the channel gain from the sub area i to the $AP_c$ or the channel gains from the sub area i to the adjacent APs ($AP_d$s), the processor is configured to:

when the average receiving power, which is from the $AP_d$, of the sub area i is less than an average channel detection threshold of the sub area i, obtain the signal to interference plus noise ratio of the sub area i by combining with the channel gain from the sub area i to the $AP_c$ and the channel gain from the sub area i to the $AP_d$; or when the average receiving power, which is from the adjacent APs (the $AP_d$s), of the sub area i is greater than or equal to the average channel detection threshold of the sub area i, obtain the signal to noise ratio of the sub area i by combining with the channel gain from the sub area i to the $AP_c$.

15. The controller according to claim 14, wherein the KPIs of the WLAN comprise: user dissatisfaction of the whole network of the WLAN, a service disruption ratio of the whole network of the WLAN, an average load of the whole network of the WLAN and distribution of signal to interference plus noise ratios or signal to noise ratios of the whole network of the WLAN.

16. The controller according to claim 15, wherein, when the KPI of the WLAN is the user dissatisfaction of the WLAN, when obtaining the KPI of the WLAN corresponding to each AP operating channel combination according to the estimated load of each AP, the processor is configured to:

obtain the user dissatisfaction of the WLAN corresponding to each AP operating channel combination according to the estimated load of each AP corresponding to each AP operating channel combination, a quantity of users of each AP and a quantity of APs of the whole network of the WLAN; or when the KPI of the WLAN is the service disruption ratio of the WLAN, when calculating the KPI of the WLAN corresponding to each AP operating channel combination according to the estimated load of each AP, the processor is configured to:

obtain the service disruption ratio of the WLAN corresponding to each AP operating channel combination according to the estimated load of each AP corresponding to each AP operating channel combination, a quantity of users of each AP, a status of a previous operating channel and a newly-allocated operating channel of each AP and quantity of APs of the whole network of the WLAN; or when the KPI of the WLAN is the distribution of the signal to interference plus noise ratios or the signal to noise ratios of the WLAN, when obtaining the KPI of the WLAN corresponding to each AP operating channel combination according to the estimated load of each AP, the processor is configured to:

accumulate distribution of signal to interference plus noise ratios or signal to noise ratios of each AP corresponding to each AP operating channel combination, and combine with a total number of APs of the whole network of the WLAN, calculate the distribution of the signal to interference plus noise ratios or the signal to noise ratios of the whole network of the WLAN corresponding to each AP operating channel combination; or when obtaining the KPIs of the WLAN corresponding to each AP operating channel combination according to the estimated load of each AP, the processor is also configured to:

accumulate the estimated load of each AP corresponding to each AP operating channel combination, and combine with a total number of APs in the whole network of the WLAN, calculate the average load of the whole network of the WLAN corresponding to each AP operating channel combination.

17. The controller according to claim 15, wherein, when selecting, according to the obtained KPIs of the WLAN, the optimal power and channel configuration scheme of the WLAN corresponding to each AP transmitting power combination, the processor is configured to:

treat the user dissatisfaction and the average load of the whole network of the WLAN corresponding to each AP operating channel combination in the set of AP operating channel combinations corresponding to each AP transmitting power combination as optimization objectives, and acquire a set of channel configuration schemes with optimal optimization objectives corresponding to each AP transmitting power combination; and obtain the service disruption ratio of the whole network of the WLAN corresponding to each configuration scheme in the set of channel configuration schemes with the optimal optimization objectives corresponding to each AP transmitting power combination, and select, from the set of channel configuration schemes with the optimal optimization objectives corresponding to each AP transmitting power combination, a configuration scheme of which the service disruption ratio is lowest as the optimal channel configuration scheme of the WLAN corresponding to each AP transmitting power combination.

18. The controller according to claim 17, wherein, when selecting the optimal power and channel configuration scheme of the WLAN from the optimal channel configuration schemes of the WLAN corresponding to all AP transmitting power combinations, the processor is configured to:

select, from the optimal channel configuration schemes of the WLAN corresponding to all AP transmitting power combinations, an AP transmitting power combination of which the service disruption ratio of the whole network of the WLAN is lowest, and select the AP transmitting power combination and the corresponding optimal channel combination as the optimal power and channel configuration scheme of the WLAN.

19. The controller according to claim 13, wherein, when obtaining the required transmission duration corresponding to the average service requirement of the sub area i, according to the signal to interference plus noise ratio or the signal to noise ratio of the sub area i and by combining with the channel bandwidth and the average service requirement of the sub area i, the processor is configured to:

obtain an obtainable rate of the sub area i according to the signal to interference plus noise ratio or the signal to noise ratio of the sub area i and by combining with the channel bandwidth of the sub area i;

obtain the required transmission duration corresponding to the average service requirement of the sub area i, according to the average service requirement of the sub area i and by combining with the obtainable rate of the sub area i.

20. The controller according to claim 19, wherein, when obtaining the total transmission duration required by all users of the $AP_c$, according to the required transmission duration corresponding to the average service requirement of the sub area i and by combining with the signal interference or the competition interference of the sub area i, the processor is configured to:

when the average receiving power, which is from the adjacent APs, of the sub area i is less than an average channel detection threshold of the sub area i, obtain a sum of required transmission durations corresponding to average service requirements of all sub areas of a coverage area of the $AP_c$, that is, the total transmission duration required by all users of the $AP_c$; or when the average receiving power, which is from the adjacent APs, of the sub area i is greater than or equal to an average channel detection threshold of the sub area i, obtain a sum of required transmission durations corresponding to average service requirements of all sub areas of a coverage area of the $AP_c$, plus transmission durations of all users of the adjacent APs, that is, the total transmission duration required by all users of the $AP_c$.

* * * * *

UNITED STATES PATENT AND TRADEMARK OFFICE
CERTIFICATE OF CORRECTION

PATENT NO. : 9,900,850 B2
APPLICATION NO. : 15/099224
DATED : February 20, 2018
INVENTOR(S) : Zhuang et al.

Page 1 of 1

It is certified that error appears in the above-identified patent and that said Letters Patent is hereby corrected as shown below:

In the Claims

Column 49, Line 28, Claim 3 "AP" should read -- $AP_C$ --.

Column 50, Line 23, Claim 6 "WLAN corresponding lo each AP" should read -- WLAN corresponding to each AP --.

Column 53, Line 7, Claim 13 "duration available for the AP" should read -- duration available for the $AP_C$ --.

Signed and Sealed this
Nineteenth Day of June, 2018

Andrei Iancu
*Director of the United States Patent and Trademark Office*